United States Patent Office 3,632,574
Patented Jan. 4, 1972

3,632,574
PROCESS FOR PRODUCING BENZODIAZEPINE DERIVATIVES
Hisao Yamamoto and Shigeho Inaba, Nishinomiya-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, and Tsuyoshi Kobayashi, Minooshi, Japan, assignors to Sumitomo Chemical Company, Ltd., Osaka, Japan
No Drawing. Filed Apr. 29, 1968, Ser. No. 725,195
Claims priority, application Japan, Sept. 22, 1967, 42/60,932, 42/60,952; Sept. 27, 1967, 42/62,424, 42/62,425, 42/62,426, 42/62,427, 42/62,428, 42/62,429, 42/62,430; Nov. 2 1967, 42/70,796; Dec. 9, 1967, 42/79,166; Dec. 15, 1967, 42/80,514; Dec. 21, 1967, 42/82,273; Jan. 10, 1968, 43/1,501
Int. Cl. C07d 53/06
U.S. Cl. 260—239.3                                  51 Claims

ABSTRACT OF THE DISCLOSURE

Benzodiazepine derivatives, which are known as tranquilizers, of the formula,

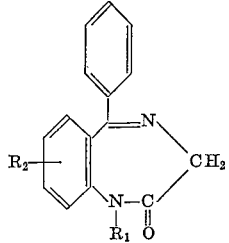

wherein $R_1$ is hydrogen or an alkyl such as methyl and propyl and $R_2$ is hydrogen or a halogen, are produced by reacting a novel 2-aminomethylindole derivative of the formula,

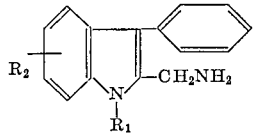

wherein $R_1$ and $R_2$ have the same meanings as defined above, with an oxidizing agent.

The said 2-aminomethylindole derivative is produced, for example, by reacting a diazonium salt of an aniline derivative with an alkyl 2-benzylacetacetate to yield a 2-alkoxycarbonyl-3-phenylindole derivative, converting the 2-substituent of an alkoxycarbonyl group to an amido group after or without alkylating the 2-alkoxycarbonyl-3-phenylindole derivative to a corresponding N-alkylated derivative, and then reducing the resultant product to yield the said 2-aminomethylindole derivative.

The present invention relates to a process for preparing benzodiazepine derivatives. More particularly, the invention pertains to a novel process for producing benzodiazepine derivatives represented by the Formula I

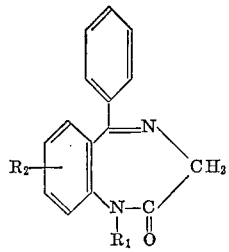

wherein $R_1$ represents a hydrogen atom or lower alkyl having 1–3 carbon atoms, and $R_2$ represents a hydrogen atom or halogen atom.

That is, the invention relates to a process, according to which benzodiazepine derivatives represented by the Formula I are readily obtained by reacting 2-aminomethylindole derivatives represented by the Formula II or their salts

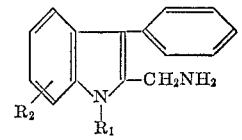

wherein $R_1$ and $R_2$ respectively have the same meanings as defined above, with an appropriate oxidizing agent.

The benzodiazepine derivatives represented by the Formula I are known as remarkably effective tranquilizers, muscle relaxants, anti-convulsants and hypnotics.

A few processes for producing the benzodiazepine derivatives have been described. For instance, which seems to be one of the most useful procedures by now, a benzodiazepine derivative is obtained in a poor yield by reacting a 2-aminobenzophenone derivative with glycine hydrochloride or glycine ethylester (German Pat. 1,145,-626). For example, crude 7-chloro-1-methyl-5-phenyl-1,3-dihydro-2H-1,4-benzodiazepine-2-one can be prepared in a yield of less than 30% by heating 5-chloro-2-methylamino-benzophenone with glycine ethylester hydrochloride.

A benzodiazepine derivative is also prepared by treating a chloroacetamidobenzophenone with ammonia. (Sternbach et al.: Journal of Organic Chemistry 27, 3788 (1962) and German Pat. 1,136,709). For example, the reaction of 2-chloroacetamido-5-chlorobenzophenone with methanolic ammonia produced 7-chloro-5-phenyl-1, 3-dihydro-2H-1,4-benzodiazepine-2-one in yield of 33%, which compound has further to be methylated by methyliodide in order to obtain 1-methyl derivative.

On the contrary to these procedures, to our astonishment, we have found that a benzodiazepine derivative having the Formula I can be prepared smoothly and economically in high yield and in high purity by reacting a 2-aminomethyl-indole derivative having the Formula II or its salt with an appropriate oxidizing agent. Such surprising process from a 5-membered ring compound to a 7-membered ring compound due to ring expansion reaction has not heretofore been described in any literature. Therefore, the novel process of the present invention is unobvious from the known method of the similar processes, and moreover very much useful and unexpected procedure.

These novel starting materials, 2-aminomethylindole derivatives are prepared easily by the reduction of indole-2-carboxamide derivatives or indole-2-carbonitrile derivatives.

These indole-2-carboxamide derivatives are also novel compounds, which are prepared by the amidation of indole-2-carboxylic acid derivatives in quantitative yield. Further, the indole-2-carboxylic acid derivatives are novel, which are obtained, for example, by reacting benzene diazonium compounds with α-benzyl-β-keto acid ester derivatives.

All of these processes proceed smoothly and give the objective products in high yield, so these procedures are very much useful in practice.

One object of the present invention is to provide a novel process for preparing benzodiazepine derivatives represented by the Formula I.

Another object is to provide a novel process for producing the salts of benzodiazepine derivatives by treating the benzodiazepine derivatives of the Formula I with mineral acid such as hydrochloric acid, sulfuric acid, nitric acid and phosphoric acid, or organic acid such as maleic acid, fumaric acid, succinic acid, formic acid, and acetic acid.

Further object of the present invention is to provide novel indole derivatives and process for preparing the same.

Other objects of the present invention will be apparent from the following description.

In order to accomplish these objects, the present invention provides a process for preparing benzodiazepine derivatives represented by the Formula I, which comprises reacting a 2-aminomethylindole derivative represented by the Formula II or its salt with an oxidizing agent.

Further the present invention provides a process for producing salts of benzodiazepine derivatives of the Formula I, which comprises reacting a 2-aminomethylindole derivative of the Formula II or its salt with an oxidizing agent to yield the said benzodiazepine derivative of the Formula I and reacting the benzodiazepine derivative of the Formula I with mineral acid such as hydrochloric acid, sulfuric acid, nitric acid, phosphoric acid, or organic acid such as maleic acid, fumaric acid, succinic acid, formic acid and acetic acid.

Still further, the present invention provides novel phenylhydrazone derivatives and benzene diazonium derivatives and a process for production thereof.

Furthermore, the present invention provides novel indole derivatives that is, 2-aminomthylindole derivatives, indole-2-carbonitrile derivatives, indole-2-carboxamide derivatives, indole-2-carboxylic acid derivatives, and a process for production thereof.

In carrying out the process for preparing the benzodiazepine derivatives according to the present invention, 2-aminomethylindole derivatives represented by the Formula II or their salts are reacted with an appropriate oxidizing agent, for example, ozone, hydrogen peroxide, peracid (e.g. performic acid, peracetic acid and perbenzoic acid), chromic acid and potassium permanganate. The oxidizing agent used in the process of the invention is not limited, however, only to those exemplified above. The reaction is generally readily effected at room temperaure. Higher or lower temperature is sometimes found more satisfactory.

Chromic acid is preferred as oxidizing agents. The reaction may preferably be carried out in the presence of a solvent. The solvent depends upon the oxidizing agents used, and is selected from water, acetone, carbon tetrachloride, acetic acid, sulfuric acid and any other solvents which do not react substantially with any of the reactants. The oxidizing agent is used in a stoichiometric amount or more. The reaction temperature used depends upon the oxidizing agent used.

In case the oxidation is carried out using chromic acid in the presence of acetic acid, it is preferable to use 2–3 times a stoichiometric amount of chromic acid and to conduct the reaction at room temperature. A 2-aminomethylindole derivative or its salt such as hydrochloride, hydrobromide, sulfate, nitrate, acetate and the like is dissolved or suspended in a solvent and an oxidizing agent is added thereto with stirring. The reaction generally completes within about 24 hours.

The desired benzodiazepine derivative can be separated from the reaction mixture in a crude form by extraction after neutralization or without neutralization and by evaporation to dryness. The product may be further purified, if desied, by recrystallization from an appropriate solvent such as ethanol, isopropanol and the like in a usual manner.

Thus, for example, the invention includes benzodiazepine derivatives such as 5-phenyl-1,3-dihydro-2H-1,4-benzodiazepine-2-one,
5-phenyl-6-chloro-1,3-dihydro-2H-1,4-benzodiazepine-2-one,
5-phenyl-7-chloro-1,3-dihydro-2H-1,4-benzodiazepine-2-one,
5-phenyl-8-chloro-1,3-dihydro-2H-1,4-benzodiazepine-2-one,
5-phenyl-9-chloro-1,3-dihydro-2H-1,4-benzodiazepine-2-one,
5-phenyl-7-bromo-1,3-dihydro-2H-1,4-benzodiazepine-2-one,
1-methyl-5-phenyl-7-chloro-1,3-dihydro-2H-1,4-benzodiazepine-2-one,
1-methyl-5-phenyl-7-bromo-1,3-dihydro-2H-1,4-benzodiazepine-2-one,
1-ethyl-5-phenyl-7-chloro-1,3-dihydro-2H-1,4-benzodiazepine-2-one and
1-propyl-5-phenyl-7-chloro-1,3-dihydro-2H-1,4-benzodiazepine-2-one.

The salts of the present invention may be prepared by reacting the benzodiazepine derivative I with the acid in a suitable solvent. The salts may be also separated from the reaction mixture by usual procedure.

2-aminomethylindole derivatives represented by the Formula II, the starting material in this process, are novel compounds. These compounds are readily produced, for example, by the following process.

The process for producing 2-aminomethylindole derivatives of the Fomula II is illustrated as follows.

At the first step for producing the 2-aminoethylindole derivatives II, a phenylhydrazone derivative represented by the Formula V

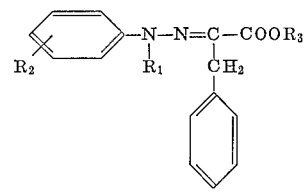

[V]

wherein $R_1$ and $R_2$ respectively have the same meanings as defined above and $R_3$ represents a hydrogen atom, alkyl having 1–4 carbon atoms or benzyl, is prepared by reacting a phenylpyruvic acid derivative represented by the Formula III

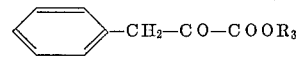

[III]

wherein $R_3$ has the same meaning as defined above, with a phenylhydrazine derivative represented by the Formula IV or its salt

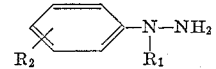

[IV]

wherein $R_1$ and $R_2$ respectively have the same meanings as defined above.

The reaction is preferably carried out in the presence of an inert solvent such as lower alcohol, e.g. methanol, ethanol and the like. The reaction proceeds at room temperature, although slightly elevated temperature may be employed to increase the rate of reaction.

Thus, for example, the invention includes phenylhydrazone derivatives such as phenylpyruvic acid phenylhydrazone,
phenylpyruvic acid p-chlorophenylhydrazone,
methyl phenylpyruvate p-chlorophenylhydrazone,
ethyl phenylpyruvate p-chlorophenylhydrazone,
tertiary butyl phenylpyruvate p-chlorophenylhydrazone,
ethyl phenylpyruvate p-chlorophenylhydrazone,
methyl phenylpyruvate $N^1$-methyl-p-chlorophenylhydrazone,
ethyl phenylpyruvate $N^1$-methyl-p-chlorophenylhydrazone,
phenylpyruvic acid $N^1$-methyl-p-chlorophenylhydrazone,
phenylpyruvic acid $N^1$-ethyl-p-chlorophenylhydrazone, phenylpyruvic acid N¹-n-propyl-p-chlorophenylhydrazone and
phenylpyruvic acid N¹-isopropyl-p-chlorophenylhydrazone.

Further, it is also possible to obtain a phenylhydrazone derivative represented by the Formula V'

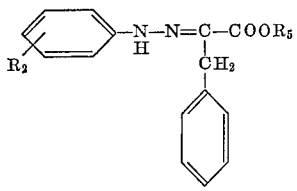

wherein $R_2$ has the same meaning as defined above and $R_5$ represents an alkyl having 1–4 carbon atoms or benzyl group, by reacting a β-keto acid ester derivative represented by the Formula VII

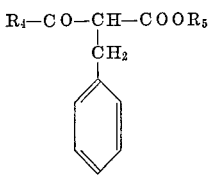

wherein $R_4$ represents an alkyl having 1–4 carbon atoms, and $R_5$ has the same meaning as defined above, with a benzene diazonium salt represented by the Formula VIII

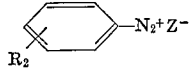

wherein Z represents a halogen atom and $R_2$ has the same meaning as defined above.

In carrying out the process of the present invention, the β-keto acid ester derivative represented by the Formula VII may be allowed to react with the diazonium salt represented by the Formula VIII in the presence of a base, for example, such as sodium hydroxide, potassium hydroxide, sodium methylate and sodium ethylate, in an appropriate solvent, for example, water, methanol and ethanol, whereby the reaction readily proceeds. Because of unstability of the diazonium salt, the reaction is preferably carried out below 10° C.

Thus, for example, the invention includes phenylhydrazone derivatives such as methyl phenylpyruvate p-chlorophenylhydrazone,
ethyl phenylpyruvate p-chlorophenylhydrazone and
tertiary butyl phenylpyruvate p-chlorophenylhydrazone.

At the second step novel indole-2-carboxylic acid derivatives represented by the Formula VI

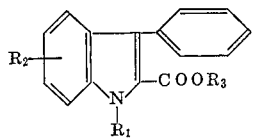

wherein $R_1$, $R_2$ and $R_3$ respectively have the same meanings as defined above, are prepared by treating these phenylhydrazone derivatives V in a solvent or solvent mixture. As solvents, there may be employed any solvent which is inert to the system as represented lower alkanols such as methanol, ethanol, isopropanol and tertiary butanol, aromatic solvents such as benzene, toluene, xylene, organic acids such as formic acid and acetic acid or other organic solvent such as acetone, chloroform and cyclohexane. The reaction is preferably carried out in the presence of acids; mineral acids such as hydrochloric acid, hydrobromic acid, sulfuric acid, phosphoric acid and polyphosphoric acid, organic acid such as formic acid and acetic acid, organic acid such as formic acid and acetic acid or other acidic reagents, including Lewis acids such as zinc chloride, iron chloride, aluminum chloride and boron fluoride. The reaction is generally effected at elevated temperature.

Thus, for example, the invention includes indole-2-carboxylic acid derivatives such as, 3-phenyl-5-chloro-indole-2-carboxylic acid,
methyl 3-phenyl-5-chloro-indole-2-carboxylate,
ethyl 3-phenyl-5-chloro-indole-2-carboxylate,
tertiary butyl 3-phenyl-5-chloro-indole-2-carboxylate,
3-phenyl-6 (or 4)-chloro-indole-2-carboxylic acid,
3-phenyl-7-chloro-indole-2-carboxylic acid and
benzyl 3-phenyl-5-chloro-indole-2-carboxylate.

Otherwise, the novel indole-2-carboxylic acid derivatives represented by the Formula VI are readily obtained by reacting the ketone derivatives represented by the Formula III with the phenylhydrazine derivative represented by the Formula IV or its salt. The reaction mentioned above can be carried out in a solvent, for example, alcohols such as methanol, ethanol, isopropanol and tertiary butanol, aromatic hydrocarbon such as benzene, toluene and xylene, organic acid such as formic acid and acetic acid, or other inert organic solvent such as acetone, chloroform and cyclohexane, preferably in the presence of an acid catalyst, for example, mineral acid such as hydrogen chloride, hydrogen bromide, sulfuric acid, phosphoric acid and polyphosphoric acid, organic acid such as formic acid and acetic acid, Lewis acid such as zinc chloride, iron chloride, aluminum chloride and boron chloride, or cation exchange resin. When a salt of tne phenylhydrazine derivative IV is used as starting material, the reaction proceeds even in the absence of the above-mentioned acid catalyst to give the objective indole derivatives VI. As a salt of the phenylhydrazine derivative IV, the following salts are useful: for example, inorganic acid salt such as hydrochloride, hydrobromide and sulfate or organic acid salt such as acetate and oxalate.

The reaction usually proceeds at room temperature, but, if desired, the reaction may be controlled by heating or cooling, though the heating and cooling are not always necessary.

Thus, for example, the invention includes indole derivatives such as, methyl 1-methyl-3-phenyl-5-chloro-indole-2-carboxylate,
1-ethyl-3-phenyl-5-chloro-indole-2-carboxylic acid,
1-methyl-3-phenyl-5-chloro-indole-2-carboxylic acid,
Methyl 1-n-propyl-3-phenyl-5-chloroindole-2-carboxylate,
1-methyl-3-phenyl-5-bromoindole-2-carboxylic acid,
1-methyl-3-phenylindole-2-carboxylic acid,
methyl 3-phenyl-5-chloroindole-2-carboxylate,
3-phenyl-5-chloroindole-2-carboxylic acid and
1-isobutyl-3-phenyl-5-chloroindole-2-carboxylic acid.

Further, novel indole-2-carboxylic acid ester derivatives represented by the Formula IX

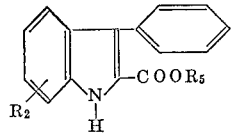

wherein $R_2$ and $R_5$ have the same meanings as defined above, is also obtained by treating a β-keto acid ester derivative represented by the Formula VII with a benzene diazonium salt derivative represented by the general Formula VIII.

In carrying out this process, the β-keto acid ester derivative represented by the aforesaid Formula VII may be allowed to react with the diazonium salt represented by the aforesaid Formula VIII in the presence of a base, such as sodium hydroxide, potassium hydroxide, sodium methylate and sodium ethylate in an appropriate solvent, such as water, methanol and ethanol, whereby the reaction readily proceeds. Because of unstability of the diazonium salt, it is preferable to carry out the reaction below 10° C., preferably below 5° C. Thereafter treatment of the reaction product with an acid causes formation of the indole-2-carboxylic acid ester derivative represented by the aforesaid Formula IX. However, an intermediate produced during this reaction is preferably once isolated and treated with an acid in an organic solvent to yield very readily the aimed indole-2-carboxylic acid ester derivative IX in good yield. In this reaction, an acid, for example, mineral acid such as hydrogen chloride, hydrogen bromide, sulfuric acid, phosphoric acid and polyphosphoric acid, or other Lewis acid such as zinc chloride, ferrous chloride, aluminum chloride, stannous chloride and boron fluoride is suitable.

In this reaction, the following solvents are most useful, for example, alcohols such as methanol, ethanol and isopropanol, aromatic hydrocarbons such as benzene, toluene and xylene, organic acids such as formic acid and acetic acid, or common organic solvents such as acetone, chloroform and cyclohexane.

Thus, for example, the invention includes indole-2-carboxylic acid ester derivatives such as methyl 3-phenyl-5-chloro-indole-2-carboxylate,
ethyl 3-phenyl-5-chloro-indole-2-carboxylate,
tertiary butyl 3-phenyl-5-chloro-indole-2-carboxylate,
benzyl 3-phenyl-5-chloro-indole-2-carboxylate,
ethyl 3-phenyl-6 (or 4)-chloro-indole-2-carboxylate and
ethyl 3-phenyl-7-chloro-indole-2-carboxylate.

Furthermore, it is also possible to obtain a novel azo derivative represented by the general Formula XXII

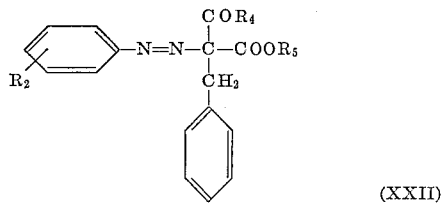

(XXII)

wherein $R_2$, $R_4$ and $R_5$ have the same meanings as mentioned above, by reacting a β-keto acid ester derivative represented by the Formula VII with a benzene diazonium salt derivative represented by the Formula VIII.

The method is the same as that for preparing a phenylhydrazone derivative V' from β-keto acid derivative VII and benzene diazonium salt derivative VIII mentioned above except that the following point. That is, as a suitable base for this purpose, a weak base such as sodium acetate, potassium acetate, is used instead of a strong base.

Thus, the obtained azo derivative XXII can give an indole-2-carboxylic acid ester derivative represented by the Formula IX by the same procedure as an indole-2-carboxylic acid ester derivative is prepared from a phenyl hydrazone derivative mentioned above.

A novel N-alkylindole-2-carboxylic acid derivative represented by the general Formula X

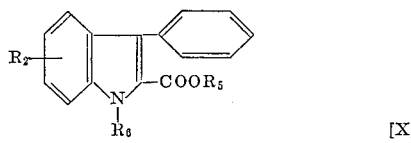

[X]

wherein $R_2$ and $R_5$ have the same meanings as defined above, and $R_6$ represents a lower alkly having 1–3 carbon atoms, is obtained by reacting an indole-2-carboxylic acid ester derivative represented by the Formula IX with alkylating agents. The alkylation is carried out by treating an indole-2-carboxylic acid derivative represented by the Formula IX in the presence of an alkaline condensing agent, if necessary, or with an alkaline condensing agent to form an alkaline metal salt thereof, and then treating with an alkylating agent.

As the alkaline condensing agent, the following compounds are useful, for example, alkali metal, alkaline earth metal, alkali metal hydride, alkaline earth metal hydride, alkali metal hydroxide, alkaline earth metal hydroxide, alkyli metal amide and alkaline earth metal amide.

Alkylation of an indole-2-carboxylic acid ester derivative represented by the Formula IX is carried out by contacting it with the following compounds, for example, alkyl halide such as methyl iodide, ethyl bromide, ethyl iodide and butyl bromide, alkyl sulfate such as dimethyl sulfate and diethyl sulfate, and such alkyl aromatic sulfonate such as methyl paratoluenesulfonate. Furthermore, diazoalkane such as diazomethane can also be used for this purpose.

Thus, for example, the invention includes indole-2-carboxylic acid derivatives such as, methyl 1-methyl-3-phenyl-5-chloro-indole-2-carboxylate,
ethyl 1-methyl-3-phenyl-5-chloro-indole-2-carboxylate,
benzyl 1-methyl-3-phenyl-5-chloro-indole-2-carboxylate,
ethyl 1-ethyl-3-phenyl-5-chloro-indole-2-carboxylate,
ethyl 1-propyl-3-phenyl-5-chloro-indole-2-carboxylate,
ethyl 1-methyl-3-phenyl-6 (or 4)-chloro-indole-2-carboxylate,
methyl 1-methyl-3-phenyl-7-chloro-indole-2-carboxylate,
ethyl 1-methyl-3-phenyl-5-bromo-indole-2-carboxylate and
ethyl-1-methyl-3-phenyl-5-fluoro-indole-2-carboxylate.

Furthermore, an indole-2-carboxylic acid derivative represented by the Formula XI

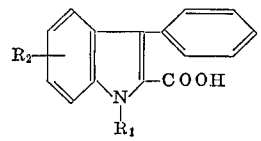

[XI]

wherein $R_1$ and $R_2$ each has the same meanings as defined above, can be produced by converting an indole-2-carboxylic acid ester derivative represented by the Formula IX or X to its corresponding acid.

The indole-2-carboxylic acid ester derivative represented by the aforesaid Formula IX or X is treated in water and/or alcohols such as methanol and ethanol, preferably in the presence of a hydrolyzing agent, to readily give the indole-2-carboxylic acid derivative represented by the Formula XI.

As a hydrolyzing agent, the following compounds are useful: for example, mineral acid such as hydrochloric acid and sulfuric acid, alkali metal such as sodium, potassium and lithium, alkali metal hydroxide such as sodium hydroxide and potassium hydroxide, alkali metal carbonate such as sodium carbonate and potassium carbonate, alkaline earth metal hydroxide such as barium hydroxide, and calcium hydroxide, and ammonia compound such as ammonium hydroxide or the like. Alkali metal hydroxide or alkaline earth metal hydroxide is preferred. The reaction can be carried out even at room temperature, preferably at an elevated temperature.

Furthermore, the indole-2-carboxylic acid ester derivative X can also be hydrolyzed by treating the same in an organic acid such as acetic acid and propionic acid in the presence of a mineral acid.

Alternatively, when $R_5$ is a tertiary butyl group, the indole-2-carboxylic acid ester derivative X can also be converted to the objective carboxylic acid XI by heating the same together with a mineral acid or toluene-sulfonic acid. When $R_5$ is a benzyl group, the benzyl group can also be removed by hydrogenosis. The objective substance can be obtained as a metal salt or ammonium salt.

Thus, for example, the invention includes such indole-2-carboxylic acid derivatives as 3-phenyl-5-chloro-indole-2-carboxylic acid,
3-phenyl-6 (or 4)-chloro-indole-2-carboxylic acid,
3-phenyl-7-chloro-indole-2-carboxylic acid,
1-methyl-3-phenyl-5-chloro-indole-2-carboxylic acid and
1-ethyl-3-phenyl-5-chloro-indole-2-carboxylic acid.

At the third step, a novel indole-2-carboxylic acid derivative represented by the Formula XII

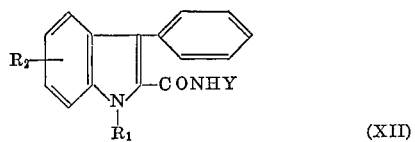

(XII)

wherein $R_1$ and $R_2$ each has the same meanings as defined above and Y represents a hydrogen atom or hydroxy, can be produced by reacting the indole-2-carboxylic acid derivative XI or its reactive derivative, for example, acid halide, ester or the like with ammonia or hydroxylamide. As the reactive derivative, acid halide, ester and acid anhydride are useful.

In this reaction, the following acid halides can be used, for example, acid chloride and acid bromide. The following esters can be used, for example, methyl ester, ethyl ester, tertiary butyl ester, benzyl ester or paranitrophenyl ester. The following acid anhydrides can be used, for example, a mixed anhydride which includes mixed anhydrides described in "Organic Reactions," vol. 12, p. 157 (1962), for example, lower aliphatic anhydride, particularly that of acetic acid or an anhydride of carboxylic acid half esters obtained by reacting an acid represented by the Formula XI with methyl chloroformate, ethyl chloroformate, isobutyl chloroformate, alkyl chloroformate, benzyl chloroformate or chloro formic acid paranitrophenyl ester.

In carrying out this process, the indole-2-carboxylic acid derivative represented by the aforesaid Formula XI or its reactive derivative such as acid halide, ester or acid anhydride is allowed to react with ammonia.

In the present reaction, the presence of a solvent is preferable. In the reaction the following solvents can be used, for example, alcohols such as methanol, ethanol and organic solvents such as acetone, benzene, toluene, xylene, chlorobenzene and chloroform.

In the present reaction, ammonia can be used by introducing gaseous ammonia to a reaction mixture or adding alcoholic ammonia (such as methanolic ammonia, ethanolic ammonia) or aqueous ammonia to a reaction mixture.

Because the reaction usually proceeds at room temperature, heating or cooling is not always necessary. However, the reaction may be controlled by heating or cooling, if desired.

Furthermore, when the indole-2-carboxylic acid derivative represented by the Formula XI or its reactive derivative is heated with hydroxylamine or its salt in an appropriate solvent, for example, in alcohol, the corresponding hydroxamic acid derivative is obtained.

Thus, for example, the invention includes indole-2-carboxylic acid derivatives XXII such as 3-phenyl-5-chloro-indole-2-carboximide,
3-phenyl-5-bromo-indole-2-carboxamide,
3-phenyl-5-fluoro-indole-2-carboxamide,
3-phenyl-6 (or )-chloro-indole-2-carboxamide,
3-phenyl-7-chloro-indole-2-carboxamide,
1-methyl-3-phenyl-5-chloro-indole-2-hydroxamic acid,
1-methyl-3-phenyl-5-chloro-indole-2-carboxamide,
1-methyl-3-phenyl-5-bromo-indole-2-carboxamide,
1-methyl-3-phenyl-5-fluoro-indole-2-carboxamide, and
1-ethyl-3-phenyl-5-chloro-indole-2-carboxamide.

An indole-2-carboxylic halide represented by the Formula XIII

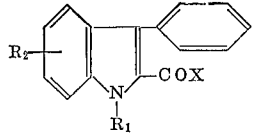

[XIII]

wherein $R_1$ and $R_2$ each have the same meanings as defined above and X represents a halogen atom, is obtained by reacting the indole-2-carboxylic acid derivative XI with a halogenating agent.

In carrying out this process, the indole-2-carboxylic acid derivative represented by the aforesaid Formula XI is treated together with a halogenating agent in the absence of a solvent or in an inert solvent, such as benzene, toluene, ether, chloroform, methylene chloride and carbon tetrachloride. As the halogenating agent, the following compounds are useful: for example, thionyl chloride, phosphorous trichloride, phosphorous tribromide, phosphorous pentachloride, phosphorous oxychloride and phosgene. In this case, the reaction rate is also accelerated by adding a basic substance such as pyridine and dimethylformamide. Furthermore, in this process, a free carboxylic acid can be used as a starting material, but the metal salt, such as sodium salt, may also be used.

After removing the solvent and excess of reacting agents, the reaction product is followed, if necessary, by treatment such as extraction with an inert solvent to give the objective product. In this case, isolation or further purification of this product is not always easy. However, the converting the indole-2-carboxylic halide, for example, the indole-2-carboxylic acid amide, isolation or purification is not always necessary and crude products or a reaction mixture may be used for the next step.

Thus, for example, the invention includes indole-2-carboxylic acid halide derivatives such as 3-phenyl-indole-2-carboxylic chloride,
3-phenyl-5-chloro-indole-2-carboxylic chloride,
3-phenyl-5-chloro-indole-2-carboxylic bromide,
3-phenyl-5-bromo-indole-2-carboxylic chloride,
3-phenyl-5-fluoro-indole-2-carboxylic chloride,
3-phenyl-5-chloro-indole-2-carboxylic bromide,
3-phenyl-indole-2-carboxylic bromide,
3-phenyl-6 (or 4)-chloro-indole-2-carboxylic chloride,
3-phenyl-7-chloro-indole-2-carboxylic chloride,
1-methyl-3-phenyl-5-chloro-indole-2-carboxylic chloride, and
1-ethyl-3-phenyl-5-chloro-indole-2-carboxylic chloride.

Furthermore, an indole derivative represented by the Formula XV

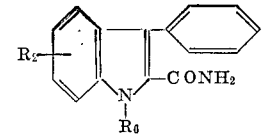

[XV]

wherein $R_2$ and $R_6$ have the same meanings as defined above, can be obtained by alkylating an amide derivative represented by the general Formula XIV

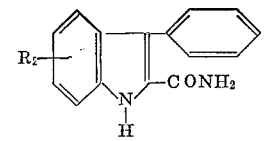

[XIV]

wherein $R_2$ has the same meaning as identified above.

In practising this process, the indole derivatives represented by the aforesaid Formula XIV give their alkaline metal salt by treating the same in the presence of an alkaline condensing agent, and then the resultant alkaline metal salt may be allowed to react with an alkylating agent. As the alkaline condensing agent, following compounds are useful: for example, alkali metal, alkaline earth metal, alkali metal hydride, alkaline earth metal hydride, alkali metal hydroxide, alkali earth metal hydroxide, alkali metal amide and alkaline earth metal amide.

Thus, for example, the invention includes compounds such as 1-methyl-3-phenyl-5-chloro-indole-2-carboxamide,
1-methyl-3-phenyl-5-bromo-indole-2-carboxamide and
1-ethyl-3-phenyl-indole-2-carboxamide.

At the final step for producing the 2-aminomethyl-indole derivatives of the Formula II, a novel 2-amino-Formula II

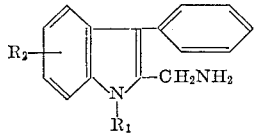

[II]

wherein $R_1$ and $R_2$ respectively have the same meanings as defined above, is obtained by converting an indole-2-carboxylic acid derivative represented by the Formula XVI

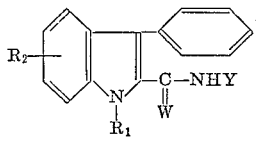

[XVI]

wherein $R_1$ and $R_2$ respectively have the same meanings as defined above and W represents an oxygen or sulfur atom and Y is hydrogen atom or hydroxyl.

In the Formula XVI, when W is a sulfur atom (i.e. indole-2-carboxylic thioamide derivative), the Compound XVI is produced, for example, by reacting indole-2-carboxylic amide derivative in which W is an oxygen atom with phosphorous pentasulfide.

In practising this process, the reduction of the indole-2-carboxylic derivative represented by the Formula XVI is carried out according to usual method of reduction, such as electrolytic reduction, reduction by alkali metal in alcohols, catalytic reduction in the presence of a catalyst such as platinum, palladium, nickel catalyst and the like, or reduction with use of metal hydride complex compound. Particularly preferred reduction agent is a metal hydride complex, for example, lithium-aluminum hydride.

The aminomethyl Compound II obtained by the above process can be converted to the corresponding salt by treating the same with an acid, for example, mineral acid such as hydrochloric acid, hydrobromic acid, sulfuric acid and phosphoric acid.

Thus, for example, the invention includes 2-aminomethyl-indole derivatives such as 2-aminomethyl-3-phenyl-indole,
2-aminomethyl-3-phenyl-5-chloro-indole,
2-aminomethyl-3-phenyl-5-bromo-indole,
2-aminomethyl-3-phenyl-6 (or 4)-chloro-indole,
2-aminomethyl-3-phenyl-7-chloro-indole,
1-methyl-2-aminomethyl-3-phenylindole,
1-methyl-2-aminomethyl-3-phenyl-5-chloro-indole,
1-ethyl-2-aminomethyl-3-phenyl-5-chloro-indole,
1-methyl-2-aminomethyl-3-phenyl-5-bromo-indole and
1-methyl-2-aminomethyl-3-phenyl-5-fluoro-indole
and their hydrochlorides, hydrobromides, sulfates, nitrates and phosphates.

Alternatively, the 2-aminomethyl indoles represented by the Formula II can also be prepared in good yield by heating the corresponding amides derivatives [XVIII] to the corresponding carbonitrile derivatives [XIX] and reducing the said carbonitrile derivatives.

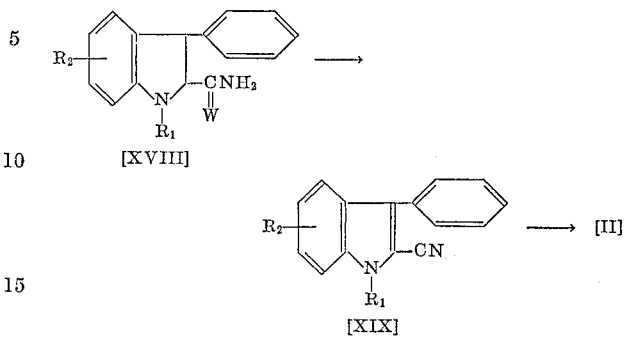

wherein $R_1$, $R_2$ and W respectively have the same meanings as defined above. More particularly, by dehydrating an indole-2-carboxylic acid amide derivative represented by the Formula XVIII, an indole-2-carbonitrile derivative [XIX] is obtained.

In practising this process, an indole-2-carboxylic amide derivative represented by the aforesaid Formula XVIII is heated, preferably in the presence of a dehydrating agent to give an indole-2-carbonitrile derivative [XIX]. As the dehydrating agent, following compounds are useful: for example, phosphorous halide such as phosphorous oxychloride, phosphorous trichloride and phosphorous pentachloride or acid chloride such as p-toluenesulfonyl chloride, methylsulfonyl chloride, acetyl chloride, thionyl chloride, benzoyl chloride and carbobenzoxy chloride in the presence or absence of an inert solvent.

Thus, for example, the invention includes indole-2-carbonitrile derivatives such as 3-phenyl-indole-2-carbonitrile,
3-phenyl-5-chloro-indole-2-carbonitrile,
3-phenyl-5-bromo-indole-2-carbonitrile,
3-phenyl-5-fluoro-indole-2-carbonitrile,
3-phenyl-5-fluoro-indole-2-carbonitrile,
3-phenyl-6 (or 4)-chloro-indole-2-carbonitrile,
3-phenyl-7-chloro-indole-2-carbonitrile,
1-methyl-3-phenyl-5-chloro-indole-2-carbonitrile and
1-ethyl-3-phenyl-5-chloroindole-2-carbonitrile.

Further, by reducing an indole-2-carbonitrile derivative represented by the Formula XIX, a 2-aminomethyl indole derivative represented by the aforesaid Formula II can readily be obtained. More particularly, reduction of the indole-2-carbonitrile derivative represented by the aforesaid general Formula XIX may be carried out by a usual method, for example, electrolytic reduction, reduction by alkali metal in alcohol, catalytic reduction by palladium, nickel or platinum, reduction by chromous acetate-alkali, or reduction by metal hydride complex. Particularly, reduction by metal hydride complex, for example, lithium aluminum hydride, boron hydride, a mixed hydride, is commercially useful from points of simplicity and selectivity.

The 2-aminomethyl-indole derivative [II] can be converted to the corresponding salt by treating with, for example, mineral acid such as hydrochloric acid, hydrobromic acid, sulfuric acid, phosphoric acid or organic acid such as acetic acid.

Thus, for example, the invention includes 2-aminomethyl-indole derivatives such as 2-aminomethyl-3-phenyl-indole,
2-aminomethyl-3-phenyl-5-chloro-indole,
2-aminomethyl-3-phenyl-5-bromo-indole,
2-aminomethyl-3-phenyl-5-fluoro-indole,
2-aminomethyl-3-phenyl-6-(or 4)-chloro-indole,
2-aminomethyl-3-phenyl-7-chloro-indole,
1-methyl-2-aminomethyl-3-phenyl-5-chloro-indole and
1-ethyl-2-aminomethyl-3-phenyl-5-chloro-indole, and their hydrochlorides, hydrobromides, sulfates, phosphates and acetates.

Otherwise 2-aminomethylindole derivatives represented by the formula,

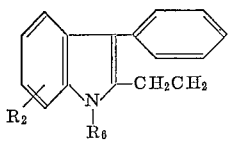

[XVII]

wherein $R_2$ and $R_6$ have the same meanings as defined above, are produced from novel N-alkyl-indole-2-carbonitrile derivatives represented by the Formula XXI

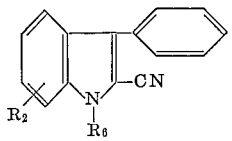

[XXI]

wherein $R_2$ and $R_6$ respectively have the same meanings as identified above, which are obtained by alkylation of an indole-2-carbonitrile derivative represented by the Formula XX

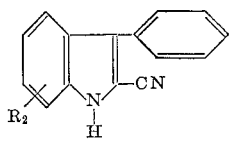

[XX]

wherein $R_2$ has the same meaning as defined above.

In practising the present process, the indole-2-carbonitrile derivative represented by the aforesaid Formula XX is treated with an alkylating agent, if necessary, in the presence of an alkaline condensing agent, or after formation of alkali metal salts by treating with an alkaline condensing agent to yield the N-alkylindole-2-carbonitrile derivative. XXI. As the alkylating agent, following compounds are useful: for example, alkyl halide such as methyl iodide, ethyl bromide and butyl bromide, alkylsulfuric ester such as dimethyl sulfate, diethyl sulfate or aromatic sulfonic alkylester such as methyl paratoluenesulfonate. As the alkaline condensing agent, following compounds are useful: for example, alkali metal, alkaline earth metal, alkali metal hydride, alkaline earth metal hydride, alkali metal hydroxide, alkaline earth metal hydroxide, alkali metal amide and alkaline earth metal amide.

Thus, for example, the invention includes N-alkylindole-2-carbonitrile derivatives such as 1-methyl-3-phenyl-indole-2-carbonitrile,
1-methyl-3-phenyl-5-chloro-indole-2-carbonitrile,
1-methyl-3-phenyl-6 (or 4)-indole-2-carbonitrile,
1-methyl-3-phenyl-7-chloro-indole-2-carbonitrile,
1-methyl-3-phenyl-5-bromo-indole-2-carbonitrile,
1-ethyl-3-phenyl-5-chloro-indole-2-carbonitrile and
1-propyl-3-phenyl-5-chloro-indole-2-carbonitrile.

Subsequently, the above-mentioned indole-2-carbonitrile derivatives XXI are reduced according to the aforesaid process, 2-aminomethyl-3-phenyl indole derivatives represented by the Formula XVII

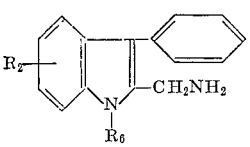

[XVII]

wherein $R_2$ and $R_6$ each has the same meaning as defined above are obtained.

The 2-aminomethyl-3-phenyl indole derivatives II are treated with an oxidizing agent mentioned before to give the benzodiazepine derivatives represented by the Formula I', which is the objective product of the present invention.

The following examples also are illustrative of the methods by which the products of this invention can be prepared and are not to be considered as limiting the invention to the particular procedural conditions employed or to the particular compounds prepared thereby.

EXAMPLE 1

To a solution of 22.5 g. of phenylpyruvic acid in 500 ml. of ethanol, was added 20 g. of p-chlorophenyl-hydrazine, and the reaction mixture was heated for 30 minutes. After completion of the reaction, the solvent was removed by distillation to give an oily p-chlorophenyl-hydrazone of phenylpyruvic acid almost quantitatively.

Infrared adsorption spectrum, $$\lambda_{max.}^{paraffin} \ 1710 \ cm.^{-1} \ (carbonyl)$$

EXAMPLE 2

According to the similar procedure to that of Example 1, there was obtained an oily phenylpyruvic acid phenylhydrazone from phenylhydrazine and phenylpyruvic acid.

The following phenylhydrazone derivatives were obtained by the procedure of Example 1.

Methyl phenylpyruvate p-chlorophenylhydrazone,
Ethyl phenylpyruvate p-chlorophenylhydrazone,
Tertiary butyl phenylpyruvate p-chlorophenylhydrazone,
Ethyl phenylpyruvate p-chlorophenylhydrazone,
Methyl phenylpyruvate $N^1$-methyl-p-chlorophenylhydrazone,
Ethyl phenylpyruvate $N^1$-methyl-p-chlorophenylhydrazone,
Phenylpyruvic acid $N^1$-methyl-p-chlorophenylhydrazone,
Phenylpyruvic acid $N^1$-ethyl-p-chlorophenylhydrazone,
Phenylpyruvic acid $N^1$-n-propyl-p-chlorophenylhydrazone,
Phenylpyruvic acid $N^1$-iso-propyl-p-chlorophenylhydrazone.

EXAMPLE 3

Into a solution of 27.1 g. of ethyl phenylpyruvate p-chlorophenylhydrazone in 30 ml. of ethanol, anhydrous hydrogen chloride gas was introduced, and the reaction mixture was then allowed to stand at room temperature for two hours. The resultant precipitate was collected by filtration, and washed with water, and recrystallized from ethanol to give 19.8 g. of ethyl 3-phenyl-5-chloro-indole-2-carboxylate.

*Elementary analysis.*—Calculated for $C_{17}H_{15}O_2NCl$ (percent): C, 67.89; N, 4.66; Cl, 11.79. Found (percent): C, 68.10; N, 4.67; Cl, 11.71. Melting point 172°–172.5° C.

EXAMPLE 4

A mixture of 131 g. of p-chloroaniline, 255 ml. of conc. hydrochloric acid and 250 ml. of water was heated into a solution, and then was cooled below 0° C. To the mixture, was added dropwise 222 g. of a 32.3% aqueous solution of sodium nitrite at a temperature below 10° C. with stirring, and then 115 g. of sodium acetate was added to the mixture. The resultant mixture was added, portionwise, to a chilled mixture of 220 g. of ethyl α-benzyl-acetoacetate, 1000 ml. of methanol and 200 g. of anhydrous potassium acetate at a temperature below 10° C. with stirring.

After addition, the reaction mixture was stirred for 2 hours at a temperature below 10° C. The precipitate was collected by filtration, washed with water thoroughly, washed with methanol and dried to give 343 g. ethyl α-benzyl-α-(p-chloro-phenyl-azo) acetoacetate. Recrystallization from ethanol gave pure product having a melting point of 61°–62.5° C.

The following compounds are similarly prepared:

Ethyl α-benzyl-α-(phenyl-azo) acetoacetate,
Methyl α-benzyl-α-(p-chloro-phenyl-azo) acetoacetate,
tert·Butyl α-benzyl-α-(p-chloro-phenyl-azo) acetoacetate, Ethyl α-benzyl-α-(p-bromo-phenyl-azo) acetoacetate, and
Ethyl α-benzyl-α-(m-chloro-phenyl-azo) acetoacetate.

EXAMPLE 5

To an ice-cold solution of 10.8 g. of ethyl α-benzyl-α-(p-chloro-phenyl-azo)-acetoacetate in 15 ml. of ethanol, was added dropwise, a solution of 2.0 g. of potassium hydroxide in 3 ml. of water.

To a reaction mixture, was added 7 ml. of water and the precipitate was collected by filtration, washed with ethanol, and then petroleum ether, and dried to give 7.9 g. of ethyl phenylpyruvate p-chlorophenylhydrazone, M.P. 87°–93° C. Recrystallization from ethanol raised the melting point to 92°–94° C.

EXAMPLE 6

To a suspension of 180 g. of ethyl α-benzyl-α-(p-chloro-phenyl-azo) acetoacetate in 500 ml. of isopropanol, was added dropwise 50 ml. of concentrated sulfuric acid. The mixture was heated under refluxing for 2.5 hours, and then cooled. The precipitate was collected by filtration, washed with isopropanol, and enough water, and dried to yield 114 g. of ethyl 5-chloro-3-phenyl-indole-2-carboxylate. Recrystallization from ethanol gave pure product having M.P. 178°–180° C.

The following compounds were similarly prepared:

Methyl 3-phenyl-5-chloro-indole-2-carboxylate,
Ethyl 3-phenyl-5-chloro-indole-2-carboxylate,
Tertiary butyl 3-phenyl-5-chloro-indole-2-carboxylate and
Benzyl 3-phenyl-5-chloro-indole-2-carboxylate.

EXAMPLE 7

A mixture of 28.8 g. of ethyl phenylpyruvate, 17.9 g. of p-chlorophenylhydrazine and 100 ml. of acetic acid was heated at 70°–80° C. for 2 hours on a steam bath. The reaction mixture was poured into ice-water, and the precipitate was collected by filtration, washed with water and dried to give ethyl 3-phenyl-5-chloro-indole-2-carboxylate.

Recrystallization from ethanol gave needles having melting point of 172°–172.5° C.

Elementary analysis.—Calculated for $C_{17}H_{15}O_2NCl$ (percent): C, 67.89; N, 4.66; Cl, 11.79. Found (percent): C, 68.01; N, 4.68; Cl, 11.69.

EXAMPLE 8

A mixture of 17.9 g. of p-chlorophenylhydrazine hydrochloride, 100 ml. of acetic acid and 24.6 g. of phenylpyruvic acid was treated according to the similar procedure to that of Example 7 to obtain 3-phenyl-5-chloro-indole-2-carboxylic acid.

Recrystallization from benzene gave a pure product having M.P. 231° C.

Elementary analysis.—Calculated for $C_{15}H_{11}O_2NCl$ (percent): C, 66.07; N, 5.14; Cl, 13.00. Found (percent): C, 66.27; N, 5.21; Cl, 12.92.

The following compounds were similarly prepared:

Methyl 1-methyl-3-phenyl-5-chloro-indole-2-carboxylate,
1-ethyl-3-phenyl-5-chloro-indole-2-carboxylic acid,
1-methyl-3-phenyl-5-chloro-indole-2-carboxylic acid,
1-n-propyl-3-phenyl-5-chloroindole-2-carboxylic acid,
1-methyl-3-phenyl-5-bromo-indole-2-carboxylic acid,
1-methyl-3-phenyl-indole-2-carboxylic acid,
Methyl 3-phenyl-5-chloro-indole-2-carboxylate,
3-phenyl-5-chloro-indole-2-carboxylic acid, and
1-isobutyl-3-phenyl-5-chloro-indole-2-carboxylic acid.

EXAMPLE 9

To a solution of 176 g. of ethyl α-benzylacetoacetate in 820 ml. of ethanol, was added 276 ml. of a 50% aqueous potassium hydroxide solution and 1630 ml. of ice-water to produce a solution.

To the solution was added dropwise an ice-cold diazonium salt solution prepared from 104 g. of p-chloroaniline in 325 ml. of conc. hydrochloric acid, and 325 ml. of water and a solution of 56.3 g. of sodium nitrite in 163 ml. of water, and the resulting solution was stirred for 5 minutes.

The reaction mixture was extracted with ether, and the ether layer was dried over sodium sulfate, and the ether was removed by distillation to give 271 g. of p-chlorophenylhydrazone of ethyl phenylpyruvate as an oily substance.

Infrared absorption spectrum:

$$\nu_{max.}^{paraffin} \ 1710 \ cm.^{-1} \ (carbonyl)$$

EXAMPLE 10

To a solution of 176 g. of ethyl α-benzylacetoacetate in 820 ml. of ethanol, was added 276 ml. of a 50% aqueous potassium hydroxide solution under cooling, and was further added 1630 ml. of ice-water.

To this solution, was added an ice-cold diazonium salt solution prepared by mixing 104 g. of p-chloroaniline in 325 ml. of conc. hydrochloric acid, 325 ml. of water and a solution of 56.3 g. of sodium nitrate in 163 ml. of water, and the resultant solution was stirred for 5 minutes.

The reaction mixture was extracted with ether, and the ether layer was dried over sodium sulfate and the ether was then removed by distillation. The resultant oily residue was dissolved in 300 ml. of ethanol and anhydrous hydrogen chloride gas was introduced to the solution until precipitates were formed. After allowing to stand at room temperature for 2 hours, the precipitates were collected by filtration, washed with water and was recrystallized from ethanol to give 19.6 g. of ethyl 3-phenyl-5-chloro-indole-2-carboxylate having M.P. 172°–172.5° C. as needles.

Elementary analysis.— Calculated for $C_{17}H_{15}O_2NCl$ (percent): C, 67.89; N, 4.66; Cl, 11.79. Found (percent): C, 68.22; N, 4.67; Cl, 11.68.

EXAMPLE 11

A mixture of 50.0 g. (0.167 mol.) of ethyl 3-phenyl-5-chloro-indole-2-carboxylate, 334 ml. of acetone and 33.4 ml. of a 66% aqueous potassium hydroxide solution was heated under refluxing. To the solution, was added dropwise 44.6 g. of dimethyl sulfate with stirring and was then heated under refluxing. After completion of the reaction, the solvent was removed by distillation under reduced pressure, and the residue was washed with water and extracted with benzene. The benzene layer was washed with water, dried over sodium sulfate and then the solvent was removed by distillation under reduced pressure to obtain 52.3 g. of orange red oily residue.

The oil residue was dissolved in 50 ml. of hot ethanol and then cooled. The precipitate was collected by filtration to give 46.2 g. (88.3%) of needles of ethyl-1-methyl-3-phenyl-5-chloro-indole-2- carboxylate, M.P. 88°–89° C.

This procedure was utilized to prepare the following compounds:

Methyl 1-methyl-3-phenyl-5-chloro-indole-2-carboxylate,
Ethyl 1-methyl-3-phenyl-5-chloro-indole-2-carboxylate,
Benzyl 1-methyl-3-phenyl-5-chloro-indole-2-carboxylate,
Ethyl 1-propyl-3-phenyl-5-chloro-indole-2-carboxylate,
Ethyl 1-methyl-3-phenyl-6 (or 4)-chloro-indole-2-carboxylate,
Methyl 1-methyl-3-phenyl-7-chloro-indole-2-carboxylate,
Ethyl 1-methyl-3-phenyl-5-bromo-indole-2-carboxylate, and
Ethyl 1-methyl-3-phenyl-5-fluoro-indole-2-carboxylate.

EXAMPLE 12

A mixture of 82 g. of ethyl 5-chloro-3-phenyl-indole-2-carboxylate and 1.2 l. of a 2.7% potassium hydroxide ethanol solution was heated under refluxing for 2 hours. The ethanol was removed by distillation and the residue was dissolved in 300 ml. of water. The solution was made acidic with conc. hydrochloric acid under cooling. The precipitate formed was collected by filtration, washed thoroughly with water and dried to give 72 g. of 5-chloro- 3-phenyl-indole-2-carboxylic acid having melting point of 227°–228° C.

Recrystallization from benzene raised the melting point to 231° C.

EXAMPLE 13

A mixture of 46.2 g. of ethyl 1-methyl-3-phenyl-5-chloro-indole-2-carboxylate and 460 cc. of ethanol containing 17.0 g. of potassium hydroxide, was heated under refluxing for 2 hours. The ethanol was removed by distillation under reduced pressure, and the residue was dissolved in 120 cc. of hot water. The solution was cooled to 10° C., and 25 cc. of conc. hydrochloric acid was added dropwise to form a precipitate. The precipitate was filtered (at 15° C.), washed with water and dried to give quantitatively 42.2 g. of 1-methyl-3-phenyl-5-chloro-indole-2-carboxylic acid, M.P. 201°–205° C.

2 g. of the obtained 1-methyl-3-phenyl-5-chloro-indole-2-carboxylic acid was recrystallized from 170 cc. of benzene to give 1.9 g. of a pure product, M.P. 211°–213° C.

EXAMPLE 14

The following compounds were obtained by a procedure similar to Example 13.

3-phenyl-6- (or 4)-chloro-indole-2-carboxylic acid,
3-phenyl-7-chloro-indole-2-carboxylic acid, and
1-ethyl-3-phenyl-5-chloro-indole-2-carboxylic acid.

EXAMPLE 15

A mixture of 13 g. of 3-phenyl-5-chloro-indole-2-carboxylic acid, 250 ml. of dry ether and 15 g. of thionyl chloride was stirred for 4 hours at room temperature. Thereafter, a small amount of a precipitate was removed by filtration, gaseous ammonia was introduced into the filtrate under ice-cooling. The reaction mixture was allowed to stand in a refrigerator for 2 hours. The resultant precipitate was collected by filtration, washed with water and dried to give 3-phenyl-5-chloro-indole-2-carboxamide. Recrystallization from benzene gave crystals having a melting point of 215°–216° C.

EXAMPLE 16

A mixture of 60 g. of 3-phenyl-5-chloro-indole-2-carboxylic acid, 1.2 l. of anhydrous benzene and 150 g. of thionyl chloride was heated and refluxed for 3 hours. After completion of the reaction, the solvent was removed by distillation under reduced pressure to give almost quantitatively 64.2 g. of 3-phenyl-5-chloro-indole-2-carboxylic acid chloride.

Gaseous ammonia was introduced to a solution of 64.2 g. of 3-phenyl-5-chloro-indole-2-carboxylic acid chloride in 1.5 l. of dry ether under ice-cooling, and the mixture was allowed to stand for 1 hr. The reaction mixture was concentrated to give crystals, which were collected by filtration, washed with water and dried to give 58 g. of 3-phenyl-5-chloro-indole-2-carboxamide, M.P. 217°–219° C.

EXAMPLE 17

To a suspension of 10 g. of 1-methyl-3-phenyl-5-chloro-indole-2-carboxylic acid in 200 cc. of anhydrous benzene, was added 12.5 g. of thionyl chloride. After heating for 3 hours, color of the solution changed to transparent yellowish brown. The benzene was distilled under reduced pressure to give a residue. It was dissolved in 200 cc. of ether, a small amount of insoluble matter was removed by filtration, and then gaseous ammonia was introduced to the ether layer for 15 minutes under cooling. Stirring was continued for additional 15 minutes and then 100 cc. of water was added. The precipitate was collected by filtration to give a crude 1-methyl-3-phenyl-5-chloro-indole-2-carboxamide. The ether layer of the filtrate was dried over sodium sulfate and concentrated under reduced pressure to dryness to give 1-methyl-3-phenyl-5-chloro-indole-2-carboxamide as the second crop. Both crude crystals were combined and were recrystallized from 75 cc. of benzene to give 1-methyl-3-phenyl-5-chloro-indole-2-carboxamide having a melting point of 191°–192° C.

The following compounds were obtained according to the same procedure.

3-phenyl-5-bromo-indole-2-carboxamide,
3-phenyl-5-fluoro-indole-2-carboxamide,
3-phenyl-6 (or 4)-chloro-indole-2-carboxamide,
3-phenyl-7-chloro-indole-2-carboxamide,
1-methyl-3-phenyl-5-chloro-indole-2-hydroxamic acid,
1-methyl-3-phenyl-5-bromo-indole-2-carboxamide,
1-methyl-3-phenyl-5-fluoro-indole-2-carboxamide and
1-ethyl-3-phenyl-5-chloro-indole-2-carboxamide.

EXAMPLE 18

A mixture of 60 g. of 3-phenyl-5-chloro-indole-2-carboxylic acid, 1.2 l. of anhydrous benzene and 150 ml. of thionyl chloride was heated under refluxing for 3 hours. The solution was evaporated under reduced pressure to dryness to give 64.2 g. of 3-phenyl-5-chloro-indole-2-carboxylic acid chloride (quantitatively).

The product was also confirmed by the following process. In 1.5 l. of dry ether, was dissolved 64.2 g. of the crude 3-phenyl-5-chloro-indole-2-carboxylic chloride. Gaseous ammonia was introduced to the mixture under ice-cooling. The reaction mixture was concentrated under reduced pressure and cooled. The precipitate was collected by filtration and dried to give 58 g. (almost quantitative) of 3-phenyl-5-chloro-indole-2-carboxamide, M.P. 217°–219° C.

EXAMPLE 19

A mixture of 29 g. of 1-methyl-3-phenyl-5-chloroindole-2-carboxylic acid and 56.2 g. of thionyl chloride was heated and refluxed for 2 hours. After completion of the reaction, excess thionyl chloride was removed by distillation to give a yellowish brown solidal substance of 1-methyl-3-phenyl-5-chloro-indole-2-carboxylic chloride.

The product was further confirmed by the following process. That is, this crude 1-methyl-3-phenyl-5-chloro-indole-2-carboxylic chloride was dissolved in 600 ml. of dry ether, and gaseous ammonia was introduced to the mixture. The precipitate was collected by filtration, washed with water and was then dried to give 26.5 g. (91.6%) of 1-methyl-3-phenyl-5-chloro - indole-2-carboxamide. The ether layer was concentrated under reduced pressure to give more 1-methyl-3-phenyl-5-chloro-indole-carboxamide as 2nd crop. The total yield was quantitative.

The following compounds were similarly obtained:

3-phenyl-indole-2-carboxylic chloride,
3-phenyl-5-chloro-indole-2-carboxylic bromide,
3-phenyl-5-bromo-indole-2-carboxylic chloride,
3-phenyl-5-fluoro-indole-2-carboxylic chloride,
3-phenyl-5-chloro-indole-2-carboxylic bromide,
3-phenyl-indole-2-carboxylic bromide,
3-phenyl-6 (or 4)-chloro-indole-2-carboxylic chloride,
3-phenyl-7-chloro-indole-2-carboxylic chloride and
1-ethyl-3-phenyl-5-chloro-indole-2-carboxylic chloride.

EXAMPLE 20

To a solution of 1.95 g. of 5-chloro-3-phenyl-indole-2-carboxamide in 20 ml. of toluene and 20 ml. of dimethylformamide, was added 0.38 g. of a 50% sodium hydride solution. The mixture was stirred at room temperature for 2 hours and then 1.2 g. of methyliodide was added to the mixture. The resulting mixture was heated under refluxing for 3 hours. The cooled reaction mixture was poured into ice-water, and extracted with ether. The organic layer was washed with saline water and allowed to stand in a refrigerator overnight. The precipitate deposited was collected by filtration, washed with cold ether and dried to give 0.7 g. of 5-chloro-1-methyl-3-phenyl-indole - 2 - carboxamide. Recrystallization from ethanol gave crystals having a melting point of 191°–192° C.

The following compounds were similarly prepared:
1-methyl-3-phenyl-5-chloro-indole-2-carboxamide,
1-methyl-3-phenyl-5-bromo-indole-2-carboxamide and
1-ethyl-3-phenyl-indole-2-carboxamide.

EXAMPLE 21

To a suspension of 20 g. of lithium-aluminum hydride in 2 l. of dry ether, was added 35 g. of 3-phenyl-5-chloro-indole-2-carboxylic amide slowly under stirring and was refluxed for 4 hours.

After completion of the reaction, the reaction mixture was cooled, and water was added dropwise to the mixture to decompose excess lithium-aluminum hydride. To the ether layer, was added 10% hydrochloric acid, and was shaken to precipitate white needles. The crystals were collected by filtration and were dried to give 32 g. (84%) of 2-aminomethyl-3-phenyl-5-chloroindole hydrochloride.

The recrystallization from ethanol gave crystals having a melting point of 231°–232° C. (decomposition).

EXAMPLE 22

To a suspension of 1.6 g. of lithium-aluminum hydride in 300 ml. of ether, was added 3.0 g. of 1-methyl-3-phenyl-5-chloro-indole-2-carboxamide. After heating for 4 hours under refluxing, the solution was cooled and 20 ml. of water was added dropwise. To the ether layer, was added dropwise 44 ml. of 12% aqueous hydrochloric acid under cooling. The crystals produced were filtered and dried to give 2.9 g. (90.0%) of 1-methyl-2-aminomethyl-3-phenyl-5-chloro-indole hydrochloride. The recrystallization from ethanol gave crystals having a melting point of 256.5° C. (decomposition).

To a suspension of 4.5 g. 1-methyl-2-amino-methyl-3-phenyl-5-chloro-indole-hydrochloride in 100 ml. of water, was added a 10% aqueous sodium hydroxide solution till the mixture showed alkaline. The reaction mixture was stirred for 1 hour at room temperature, filtered, washed with water and dried to give 3.8 g. of 1-methyl-2-aminomethyl-3-phenyl-5-chloro-indole. Recrystallization from aqueous ethanol gave crystals having melting point of 60°–67° C. The procedure was utilized to prepare the following compounds:

2-aminomethyl-3-phenyl-indole,
2-aminomethyl-3-phenyl-5-bromo-indole,
2-aminomethyl-3-phenyl-6 (or 4)-chloro-indole,
2-aminomethyl-3-phenyl-7-chloro-indole,
1-methyl-2-aminomethyl-3-phenyl-indole,
1-ethyl-2-aminomethyl-3-phenyl-5-chloro-indole,
1-methyl-2-aminomethyl-3-phenyl-5-bromo-indole,
1-methyl-2-aminomethyl-3-phenyl-5-fluoro-indole, and
their hydrochlorides.

EXAMPLE 23

To a suspension of lithium-aluminium hydride in ether prepared from 6.7 g. of lithium hydride, 1.6 g. of anhydrous aluminum bromide and anhydrous aluminum chloride in ether, was added portionwise 22.8 g. of 1-methyl-3-phenyl-5-chloro-indole-2-carboxamide. The mixture was stirred for 20 minutes at room temperature and heated for 6 hours under refluxing. The reaction mixture was cooled and then 55 ml. of water was added dropwise. To the organic layer, was added dropwise 26 g. of 30% sulfuric acid under cooling. The precipitate deposited was collected by filtration, washed with ether and dried to give 1-methyl-2-aminomethyl-3-phenyl-5-chloro-indole sulfate, M.P. 243°–245° C. (decomposition).

EXAMPLE 24

A mixture of 9.0 g. of 3-phenyl-5-chloro-indole-2-carboxamide and 44.5 g. of phosphorous oxychloride was heated under reflux for 15 minutes. The ice-cold reaction mixture was filtered, washed with ice-water and dried to give 7 g. of 5-chloro-3-phenyl-indole-2-carbonitrile, M.P. 212°–214° C. The filtrate was poured into ice-water and the resulting precipitate was collected by filtration, washed with water and dried to give 1.1 g. of additional 5-chloro-3-phenyl-indole - 2 - carbonitrile, M.P. 200°–202.5° C.

The following compounds were similarly prepared:
3-phenyl-indole-2-carbonitrile,
3-phenyl-5-chloro-indole-2-carbonitrile,
3-phenyl-5-bromo-indole-2-carbonitrile,
3-phenyl-5-fluoro-indole-2-carbonitrile,
3-phenyl-6 (or 4)-chloro-indole-2-carbonitrile,
3-phenyl-7-chloro-indole-2-carbonitrile,
1-methyl-3-phenyl-5-chloro-indole-2-carbonitrile and
1-ethyl-3-phenyl-5-chloro-indole-2-carbonitrile.

EXAMPLE 25

To a suspension of 2 g. of lithium-aluminum hydride in 300 ml. of dry ether, was added dropwise 3.52 g. of 3-phenyl-5-chloro-indole-2-carbonitrile with stirring. After addition, the mixture was refluxed for 4 hours. After completion of the reaction, the reaction mixture was cooled with ice, water was added dropwise to the mixture with stirring to decompose excess lithium-aluminum hydride. The ether layer was separated, dried with sodium sulfate and then the solvent was removed by distillation under reduced pressure to give 3.3 g. of 2-aminomethyl-3-phenyl-5-chloroindole.

To a solution of 2-aminomethyl - 3 - phenyl - 5 - chloroindole in ether, was added 10% hydrochloric acid and mixture was shaken. The precipitate was collected by filtration to give 2-aminomethyl-3-phenyl-5-chloro-indole hydrochloride. Recrystallization from ethanol gave crystals having a melting point of 231°–232° C. (decomposition).

EXAMPLE 26

1-methyl-2-aminomethyl-3-phenyl - 5 - chloroindole was prepared from 1-methyl-3-phenyl - 5 - chloroindole-2- carbonitrile according to the method of Example 25. To a solution of 1-methyl-2-aminomethyl-3-phenyl - 5 - chloroindole in ether, was introduced gaseous hydrogen chloride to give 1-methyl-2-aminomethyl-3-phenyl-5-chloroindole hydrochloride. Recrystallization from ethanol gave crystals having a melting point of 256° C. (decomposition).

EXAMPLE 27

2-aminomethyl-3-phenyl - 5 - chloroindole was prepared from 3-phenyl-5-chloroindole-2-carbonitrile according to the method of Example 25. To a solution of 2-aminomethyl-3-phenyl-5-chloroindole in ether was introduced gaseous hydrogen chloride to give the hydrochloride. Recrystallized from ethanol to give colorless needles having a melting point of 256° C. (decomposition).

The following compounds were similarly prepared:
2-aminomethyl-3-phenyl-indole,
2-aminomethyl-3-phenyl-5-bromo-indole,
2-aminomethyl-3-phenyl-5-fluoro-indole,
2-aminomethyl-3-phenyl-6 (or 4)-chloro-indole,
2-aminomethyl-3-phenyl-7-chloro-indole, and
1-ethyl-2-aminomethyl-3-phenyl-5-chloro-indole.

EXAMPLE 28

A mixture of 1.0 g. of 3-phenyl - 5 - chloro - indole-2-carbonitrile, 7.0 ml. of acetone and 0.7 ml. of 70% aqueous potassium hydroxide was stirred at room temperature to form a solution. After removing a small amount of insoluble matter by filtration, the filtrate was treated with 0.7 ml. of dimethyl sulfate and the mixture was stirred at room temperature for 30 minutes. After removing the acetone by distillation under reduced pressure, the residue was treated with water, filtered, washed with water and dried to give 1.0 g. of 1-methyl-3-phenyl-5-chloroindole-2-carbonitrile, M.P. 128°–130° C. Recrystallization from methanol raised the melting point to 128.5°–130.5° C.

The following compounds were similarly prepared:

1-methyl-3-phenyl-indole-2-carbonitrile,
1-methyl-3-phenyl-5-chloro-indole-2-carbonitrile,
1-methyl-3-phenyl-6 (or 4)-indole-2-carbonitrile,
1-methyl-3-phenyl-7-chloro-indole-2-carbonitrile,
1-methyl-3-phenyl-5-bromo-indole-2-carbonitrile.

EXAMPLE 29

A mixture solution of 1.0 g. of 2-aminomethyl-3-phenyl-5-chloroindole hydrochloride, 40 ml. of acetic acid and 25 ml. of 30% aqueous hydrogen peroxide was stirred for a few hours at room temperature. The crystals produced were removed by filtration. The filtrate was made alkaline with aqueous ammonia and was extracted with methylene chloride. The methylene chloride layer was extracted with 10% hydrochloric acid. The hydrochloric acid layer was again made alkaline with aqueous ammonia, extracted with methylene chloride, dried over sodium sulfate and then the solvent was removed by distillation under reduced pressure to give crude 5-phenyl-7-chloro-1,3-dihydro-2H-1,4-benzodiazepine-2 - one. Recrystallization from methanol gave crystals having a melting point of 212°–213° C., which was undepressed when admixed with authentic sample. Infrared adsorption spectra were identical.

EXAMPLE 30

1-methyl-5-phenyl - 7 - chloro - 1,3 - dihydro - 2H - 1,4-benzodiazepine-2-one, M.P. 129°–130° C. was prepared from 1-methyl-2-aminomethyl-3-phenyl - 5 - chloroindole hydrochloride according to the method of Example 29.

The melting point of the product was not depressed when admixed with an authentic sample and the infrared adsorption spectra were identical.

EXAMPLE 31

A treatment of 1.0 g. of 2-aminomethyl-3-phenyl-5-chloro-indole with 40 ml. of acetic acid and 25 ml. of 30% aqueous hydrogen peroxide gave crude 5-phenyl-7-chloro-1,3-dihydro-2H-1,4 - benzodiazepine - 2 - one, M.P. 207°–210° C., according to the method of Example 29.

EXAMPLE 32

To a suspension of 1 g. of 2-aminomethyl-3-phenyl-5-chloroindole hydrochloride in 10 ml. of acetic acid was added dropwise 2 ml. of an aqueous solution of 1 g. of chromic anhydride with stirring. The reaction was exothermic and the product was colored. After stirring at room temperature, the reaction mixture was warmed. After completion of the reaction, the reaction mixture was allowed to cool, and added to water to remove an insoluble substance by filtration. The filtrate was made alkaline with 28% aqueous ammonia and extracted with methylene chloride. The methylene chloride layer was extracted with 10% hydrochloric acid. The extract was again made alkaline with aqueous ammonia and extracted with methylene chloride, dried over sodium sulfate, and the solvent was removed by distillation. Ethanol-hydrochloric acid was added to the residue to give 5-phenyl-7-chloro-1,3-dihydro-2H-1,4-benzodiazepine - 2 - one hydrochloride, M.P. 249°–250° C.

EXAMPLE 33

To a mixture of 3 g. of 1-methyl-2-aminomethyl-3-phenyl-5-chloroindole and 30 ml. of acetic acid, was added a solution of 3 g. of chromic anhydride in 3 ml. of water under cooling. Stirring was continued overnight at room temperature. The reaction mixture was poured into 150 ml. of water, made alkaline with aqueous ammonia and extracted with chloroform. The chloroform layer was dried over sodium sulfate, and distilled under reduced pressure to a residue, to which was added a small amount of ethanol to give 2.2 g. of crystals of 1-methyl-5-phenyl-7-chloro-1,3-dihydro-2H-1,4-benzodiazepine - 2 - one. Recrystallization from methanol gave crystals having a melting point, 130°–132° C.

EXAMPLE 34

To a suspension of 10.0 g. of 1-methyl-2-aminomethyl-3-phenyl-5-chloroindole hydrochloride in 100 ml. of acetic acid, was added dropwise a solution of 10 g. of chromic anhydride in 10 ml. of water under cooling, and was then stirred at room temperature overnight. The reaction mixture was added dropwise to a solution mixture of 200 ml. of 28% aqueous ammonia and 200 ml. of water with stirring under cooling. When pH of the solution was adjusted to about 9, fine crystals were precipitated. The mixture was extracted with carbon tetrachloride, and the extract was washed with a small amount of water, and then dried over sodium sulfate and decolorized with 0.5 g. of active carbon. The mixture was filtered, and the precipitate was washed with a small amount of carbon tetrachloride. The filtrate and washing liquid were combined and distilled under reduced pressure to obtain an oily residue, which was solidified by treatment with 8 ml. of alcohol. After cooling, precipitated crystals were collected by filtration, washed with a small amount of cold isopropyl alcohol, and dried to give 7.05 g. (74.5%) of 1-methyl-5-phenyl-7-chloro-1,3-dihydro-2H-1,4-benzodiazepine-2-one.

The filtrate and washing liquid were combined, and distilled under reduced pressure to a residue, which was dissolved in 20 ml. of carbon tetrachloride, extracted with 20 ml. of 4 N hydrochloric acid, and the extract was washed with a small amount of carbon tetrachloride. The extract was neutralized with a 10 N aqueous sodium hydroxide solution under cooling to adjust the pH thereof to about 9. The solution was again extracted with 20 ml. of carbon tetrachloride. The extract was washed with water, and dried with sodium sulfate. To the mixture was added 0.1 g. of active carbon, filtered and washed with a small amount of carbon tetrachloride. The filtrate and washing liquid were combined, and distilled under reduced pressure to a residue, which was crystallized by treatment with 2 ml. of isopropyl alcohol to 0.7 g. (7.4% yield) of 1-methyl-5-phenyl-7-chloro-1,3-dihydro-2H-1,4 - benzodiazepine-2-one, M.P. 126°–129° C.

EXAMPLE 35

To a suspension of 11.67 g. of 1-methyl-2-aminomethyl-3-phenyl-5-chloro-indole sulfate in 50 g. of acetic acid, was added a solution of 11 g. of chromic anhydride in 11 ml. of water under cooling. The mixture was processed according to the method of Example 33 to give 6.9 g. (76.5% yield) of 1-methyl-5-phenyl-7-chloro-1,3-dihydro-2H-1,4-benzodiazepine-2-one, M.P. 130°–132° C.

The following compounds were similarly prepared:

5-phenyl-1,3-dihydro-2H-1,4-benzodiazepine-2-one,
5-phenyl-6-chloro-1,3-dihydro-2H-1,4-benzodiazepine-2-one,
5-phenyl-8-chloro-1,3-dihydro-2H-1,4-benzodiazepine-2-one,
5-phenyl-9-chloro-1,3-dihydro-2H-1,4-benzodiazepine-2-one,
5-phenyl-7-bromo-1,3-dihydro-2H-1,4-benzodiazepine-2-one,
1-methyl-5-phenyl-7-bromo-1,3-dihydro-2H-1,4-benzodiazepine-2-one,
1-ethyl-5-phenyl-7-chloro-1,3-dihydro-2H-1,4-benzodiazepine-2-one, and
1-propyl-5-phenyl-7-chloro-1,3-dihydro-2H-1,4-benzodiazepine-2-one.

EXAMPLE 36

To a solution of 2.98 g. of 1-methyl-2-aminomethyl-3-phenyl-5-chloroindole in 17 ml. of acetic acid, was added dropwise a solution of 4.8 g. of potassium bichromate and 25 g. of conc. sulfuric acid in 70.7 ml. of water under cooling, and was then stirred overnight. To the reaction mixture was added 100 ml. of water and then aqueous ammonia was added thereto to adjust the pH of the solution to 9. The solution was extracted with chloroform. The mixture was filtered and then fractionated. The chloroform layer was dried over sodium sulfate, then treated with active carbon and the solvent was removed by distillation under reduced pressure. The residue was crystallized by treatment with 1.5 ml. of ethanol to give 0.81 g. of 1-methyl-5-phenyl-7-chloro-1,3-dihydro-2-H-1,4-benzodiazepine-2-one, M.P. 128.5°–130.5° C.

EXAMPLE 37

To a suspension of 10.0 g. of 1-methyl-2-aminomethyl-3-phenyl-5-chloroindole sulfate in 50 ml. acetic acid, was added dropwise a solution of 5.4 g. of chromic acid in 5.5 ml. of water at a temperature below 30° C. The mixture was stirred at room temperature overnight, 350 ml. of water was added to the reaction mixture, and extracted with carbon tetrachloride. The separated oily substance was separated by decantation and dissolved in acetone. The acetone solution was concentrated to dryness and the residue was crystallized from carbon tetrachloride to give 1-methyl-5-phenyl-7-chloro-1,3-dihydro-2H-1,4-benzodiazepine-2-one chromate. Its infrared spectra were identical with that which was prepared by treating 1-methyl-5-phenyl-7-chloro-1,3-dihydro-2H - 1,4 - benzodiazepine-2-one with chromic anhydride in acetic acid.

The carbon tetrachloride layer was dried over sodium sulfate and concentrated to dryness under reduced pressure. The residue wac crystallized from isopropanol to yield 4.02 g. of 1-methyl-5-phenyl-7-chloro-1,3-dihydro-2H-1,4-benzodiazepine-2-one having a melting point of 131°–133° C.

What is claimed is:

1. A process for preparing a benzodiazepine represented by the formula,

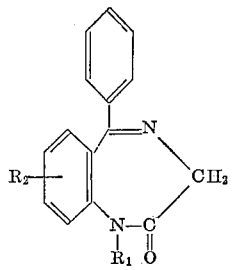

(I)

wherein $R_1$ is hydrogen or alkyl having 1 to 3 carbon atoms, and $R_2$ is hydrogen or a halogen, which comprises reacting a 2-aminomethyl indole represented by the formula,

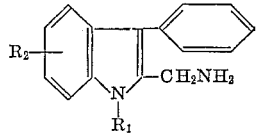

(II)

wherein $R_1$ and $R_2$ respectively have the same meanings as defined above or the acid salt thereof, with at least the stoichiometric amount of an oxidizing agent selected from the group consisting of ozone, hydrogen peroxide, peracids, chromic acid and potassium permanganate in the presence of an inert solvent.

2. A process for preparing a benzodiazepine represented by the formula,

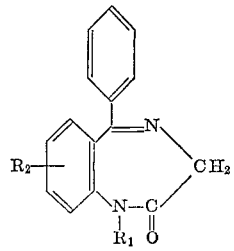

(I)

wherein $R_1$ is a hydrogen or an alkyl having 1 to 3 carbon atoms, and $R_2$ is hydrogen or a halogen, which comprises reducing an indole-2-carbonitrile represented by the formula,

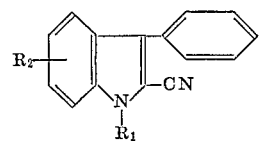

(XIX)

wherein $R_1$ and $R_2$ respectively have the same meanings as defined above, to yield a 2-aminomethyl indole represented by the formula,

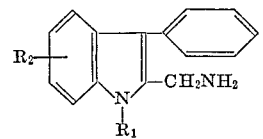

(II)

wherein $R_1$ and $R_2$ respectively have the same meanings as defined above, and then reacting the resultant 2-aminomethyl indole of the Formula II or the acid addition salt with at least the stoichiometric amount of an oxidizing agent selected from the group consisting of ozone, hydrogen peroxide, peracids, chromic acid and potassium permanganate in the presence of an inert solvent.

3. A process according to claim 2 wherein said indole-2-carbonitrile is reduced by electrolytic reduction, reduction by alkali metal in alcohol, catalytic reduction, reduction by chromous acid-alkali or reduction by metal hydride complex.

4. A process for preparing a benzodiazepine represented by the formula,

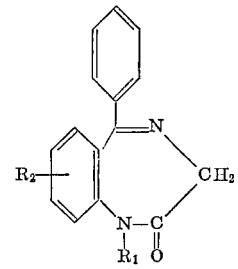

(I)

wherein $R_1$ is hydrogen or an alkyl having 1 to 3 carbon atoms, and $R_2$ is hydrogen or a halogen, which comprises heating indole 2-carboxylic acid amide represented by the formula,

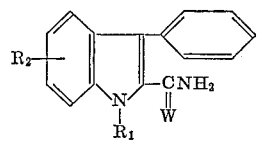

(XVIII)

wherein $R_1$ and $R_2$ respectively have the same meanings as defined above and W is oxygen or sulfur in the presence of a compound selected from the group consisting of phosphorus halide and acid chloride, to yield an indole-2-carbonitrile represented by the formula,

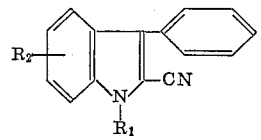

(XIX)

wherein $R_1$ and $R_2$ respectively have the same meanings as defined above, reducing the resultant indole-2-carbonitrile to yield a 2-aminomethyl indole represented by the formula,

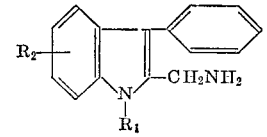

(II)

wherein $R_1$ and $R_2$ respectively have the same meanings as defined above, and then reacting the resultant 2-aminomethyl indole of the Formula II or the acid addition salts thereof with at least the stoichiometric amount of an oxidizing agent selected from the group consisting of ozone, hydrogen peroxide, peracids, chromic acid and potassium permanganate in the presence of an inert solvent.

5. A process according to claim 4 wherein said resultant indole-2-carbonitrile is reduced by electrolytic reduction, reduction by alkali metal in alcohol, catalytic reduction, reduction by chromous acid-alkali or reduction by metal hydride complex.

6. A process according to claim 4 wherein said indole-2-carboxylic acid amide is heated further in the presence of an inert solvent.

7. A process for preparing a benzodiazepine represented by the formula,

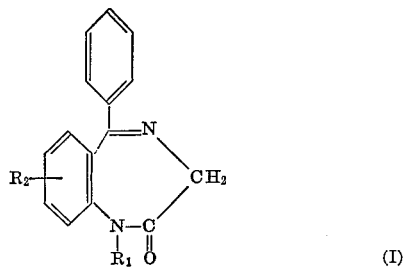

(I)

wherein $R_1$ is hydrogen or an alkyl having 1 to 3 carbon atoms, and $R_2$ is a hydrogen atom or a halogen atom, which comprises reacting an indole-2-carboxylic acid represented by the formula,

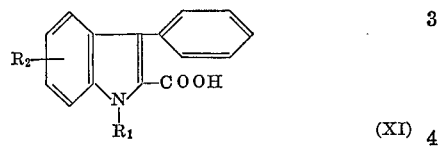

(XI)

wherein $R_1$ and $R_2$ respectively have the same meanings as defined above or the acid halide or mixed anhydride thereof in the presence of a solvent with ammonia further, if necessary, reacting a resultant compound with phosphorous pentasulfide to yield an indole represented by the formula,

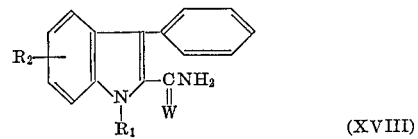

(XVIII)

wherein $R_1$ and $R_2$ respectively have the same meanings as defined above and W is oxygen or sulfur, heating the resultant indole of the Formula XVIII in the presence of a compound selected from the group consisting of phosphorus halide and acid chloride to yield an indole-2-carbonitrile represented by the formula,

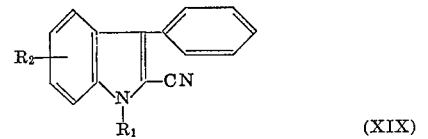

(XIX)

wherein $R_1$ and $R_2$ respectively have the same meanings as defined above, reducing the resultant indole-2-carbonitrile of the Formula XIX to a 2-aminomethyl indole represented by the formula,

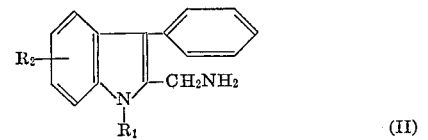

(II)

wherein $R_1$ and $R_2$ respectively have the same meanings as defined above, and then reacting the resultant 2-aminomethyl indole of the Formula II or the acid addition salts thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I.

8. A process according to claim 7 wherein said resultant indole-2-carbonitrile is reduced by electrolytic reduction, reduction by alkali metal in alcohol, catalytic reduction, reduction by chromous acid-alkali or reduction by metal hydride complex.

9. A process according to claim 7 wherein said indole-2-carboxylic acid amide of the Formula XVIII is heated further in the presence of an inert solvent.

10. A process according to claim 7 wherein said solvent is selected from the group consisting of alkanols, acetone, benzene, toluene, xylene, chlorobenzene and chloroform.

11. A process for preparing a benzodiazepine represented by the formula,

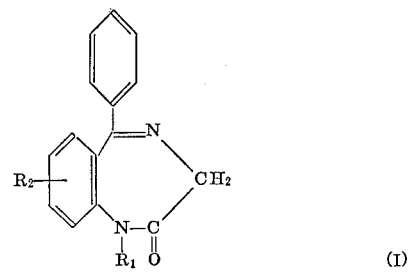

(I)

wherein $R_1$ is hydrogen or an alkyl having 1 to 3 carbon atoms, and $R_2$ is hydrogen or a halogen, which comprises reacting an indole-2-carboxylic acid represented by the formula,

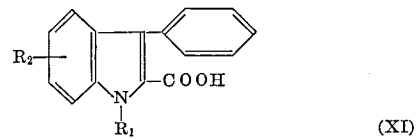

(XI)

wherein $R_1$ and $R_2$ respectively have the same meanings as defined above, with halogenating agent selected from the group consisting of thionyl chloride, phosphorous trichloride, phosphorus tribromide, a phosphorous pentachloride, phosphorous chloride and carbon tetrachloride to yield an indole-2-carboxylic halide represented by the formula,

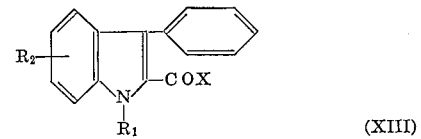

(XIII)

wherein $R_1$ and $R_2$ respectively have the same meanings as defined above and X is a halogen, reacting the resultant indole-2-carboxylic acid halide with ammonia and further, if necessary, reacting the resultant compounds with phosphorus pentasulfide to yield an indole-2-carboxylic acid amide represented by the formula,

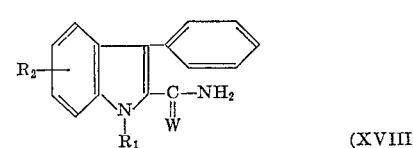

(XVIII)

wherein $R_1$ and $R_2$ respectively have the same meanings as defined above, and W is oxygen or sulfur, heating the resultant indole-2-carboxylic amide of the Formula XVIII in the presence of a compound selected from the group consisting of a phosphorus halide and an acid chloride to yield an indole-2-carbonitrile represented by the formula,

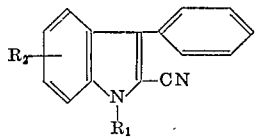

(XIX)

wherein $R_1$ and $R_2$ respectively have the same meanings as defined above, reducing the resultant indole-2-carbonitrile of the Formula XIX to yield a 2-aminomethyl indole represented by the formula,

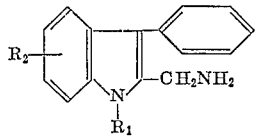

(II)

wherein $R_1$ and $R_2$ respectively have the same meanings as defined above, and reacting the resultant 2-aminomethyl indole of the Formula II or the acid addition salts thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I.

12. A process according to claim 11 wherein said resultant indole-2-carbonitrile is reduced by electrolytic reduction, reduction by alkali metal in alcohol, catalytic reduction, reduction by chromous acid-alkali or reduction by metal hydride complex.

13. A process according to claim 11 wherein said indole-2-carboxylic acid amide of the Formula XVIII is further heated in the presence of an inert solvent.

14. A process according to claim 11 wherein said indole-2-carboxylic acid of the Formula XI is reacted in the presence of a solvent selected from the group consisting of benzene, toluene, ether, chloroform, methylene chloride and carbon tetrachloride.

15. A process for preparing a benzodiazepine represented by the formula,

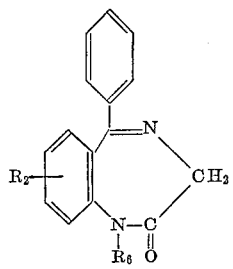

(I')

wherein $R_2$ is hydrogen or a halogen and $R_6$ is an alkyl having 1 to 3 carbon atoms, which comprises reacting an alkaline metal salt of the indole represented by the formula,

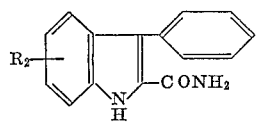

(XIV)

wherein $R_2$ has the same meaning as defined above, with an alkylating agent selected from the group consisting of alkyl halide, alkyl sulfonate and alkyl aromatic sulfonate to yield an indole represented by the formula,

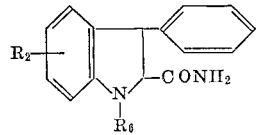

(XV)

wherein $R_2$ and $R_6$ respectively have the same meaning as defined above, reducing the resultant indole of the Formula XV to yield a 2-aminomethyl indole represented by the formula,

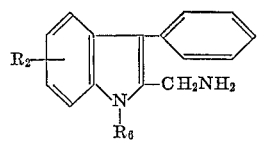

(XVII)

wherein $R_2$ and $R_6$ respectively have the same meanings as defined above, and reacting the resultant 2-aminomethyl indole of the Formula XVII or the acid addition salts thereof with at least the stoichometric amount of an oxidizing agent selected from the group consisting of ozone, hydrogen peroxide, peracids, chromic acid and potassium permanganate in the presence of an inert solvent to yield the benzodiazepine of the Formula I'.

16. A process for preparing a benzodiazepine represented by the formula,

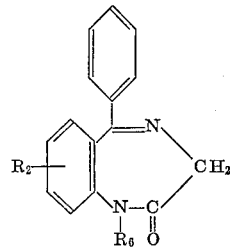

(I')

wherein $R_2$ is hydrogen or a halogen and $R_6$ is an alkyl having 1 to 3 carbon atoms, which comprises reacting an indole-2-carbonitrile represented by the formula,

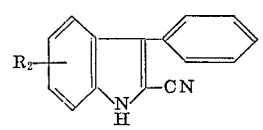

(XX)

wherein $R_2$ has the same meaning as defined above with an alkylating agent selected from the group consisting of alkyl halide, alkyl sulfonate and alkyl aromatic sulfonate in the presence of an alkaline condensing agent selected from the group consisting of alkali metal, alkaline earth metal, alkali metal hydride, alkaline earth metal hydride, alkali metal hydroxide and alkali metal amide, to yield an indole-2-carbonitrile represented by the formula,

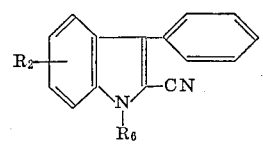

(XXI)

wherein $R_2$ and $R_6$ respectively have the same meanings as defined above, reducing the resultant indole-2-carbonitrile of the Formula XXI to yield a 2-aminomethyl indole represented by the formula,

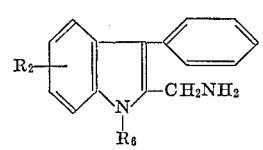

(XVII)

wherein $R_2$ and $R_6$ respectively have the same meanings as defined above, and then reacting the resultant 2-aminomethyl indole of the Formula XVII or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I'.

17. A process according to claim 16 wherein said resultant indole-2-carbonitrile is reduced by electrolytic reduction, reduction by alkali metal in alcohol, catalytic reduction, reduction by chromous acid-alkali or reduction by metal hydride complex.

18. A process for preparing a benzodiazepine represented by the formula,

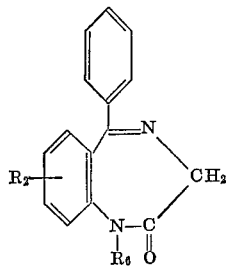

(I')

wherein $R_2$ is hydrogen or a halogen and $R_6$ is an alkyl having 1 to 3 carbon atoms, which comprises reacting an indole-2-carbonitrile represented by the formula,

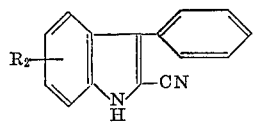

(XX)

wherein $R_2$ has the same meanings as defined above with an alkaline condensing agent selected from the group consisting of alkali metal, alkaline earth metal, alkali metal hydride, alkaline earth metal hydride, alkali metal hydroxide and alkali metal amide and then reacting the resultant alkali metal salt with an alkylating agent selected from the group consisting of alkyl halide, alkyl sulfonate and alkyl aromatic sulfonate to yield an indole-2-carbonitrile represented by the formula,

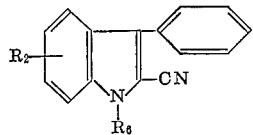

(XXI)

wherein $R_2$ and $R_6$ respectively have the same meanings as defined above, reducing the resultant indole-2-carbonitrile of the Formula XXI to yield a 2-aminomethyl indole represented by the formula,

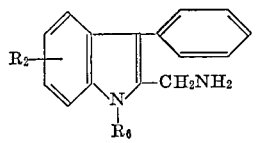

(XVII)

wherein $R_2$ and $R_6$ respectively have the same meanings as defined above, and then reacting the resultant 2-aminomethyl indole of the Formula XVII or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I'.

19. A process according to claim 18 wherein said resultant indole-2-carbonitrile is reduced by electrolytic reduction, reduction by alkali metal in alcohol, catalytic reduction, reduction by chromous acid-alkali or reduction by metal hydride complex.

20. A process for preparing a benzodiazepine by the formula,

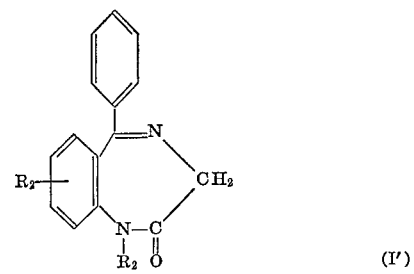

(I')

wherein $R_2$ is hydrogen or a halogen, and $R_6$ is an alkyl having 1 to 3 carbon atoms, which comprises reacting an alkaline metal salt of an indole represented by the formula,

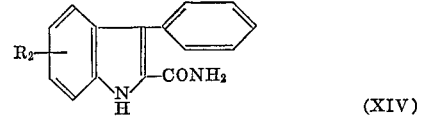

(XIV)

wherein $R_2$ is hydrogen or a halogen with an alkylating agent selected from the group consisting of alkyl halide, alkyl sulfonate and alkyl aromatic sulfonate to yield an indole represented by the formula,

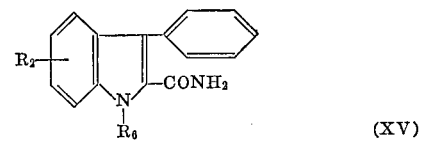

(XV)

wherein $R_2$ has the same meanings as defined above and $R_6$ is an alkyl having 1 to 3 carbon atoms, heating the resultant indole of the Formula XV in the presence of a compound selected from the group consisting of a phosphorus halide and an acid chloride to yield an indole-2-carbonitrile represented by the formula,

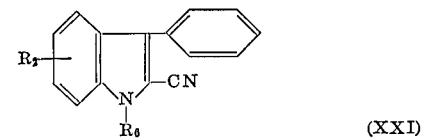

(XXI)

wherein $R_2$ and $R_6$ respectively have the same meanings as defined above, reducing the resultant indole-2-carbonitrile of the Formula XXI to a 2-aminomethyl indole represented by the formula,

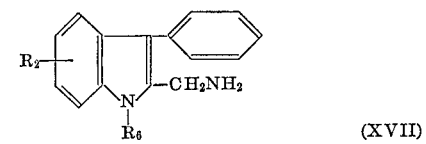

(XVII)

wherein $R_2$ and $R_6$ respectively have the same meanings as defined above, and then reacting the resultant 2-aminomethyl indole (XVII) or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I'.

21. A process according to claim 20 wherein said resultant indole-2-carbonitrile is reduced by electrolytic reduction, reduction by alkali metal in alcohol, catalytic reduction, reduction by chromous acid alkali or reduction by metal hydride complex.

22. A process according to claim 20 wherein the resultant indole of the Formula XV is heated in the further presence of an inert solvent.

23. A process for preparing a benzodiazepine represented by the formula,

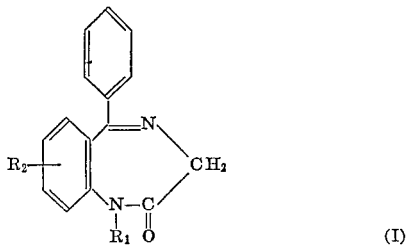

wherein $R_1$ is hydrogen, an alkyl having 1 to 3 carbon atoms, and $R_2$ is hydrogen or a halogen, which comprises, reacting an indole-2-carboxylic acid ester represented by the formula,

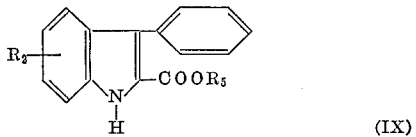

or an N-alkylindole-2-carboxylic acid represented by the formula,

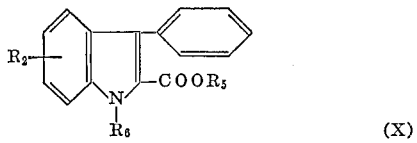

wherein $R_2$ has the same meanings as defined above, $R_5$ is an alkyl having 1 to 4 carbon atoms or benzyl and $R_6$ is an alkyl having 1 to 3 carbon atoms, with water, alkanols or water and alkanols in the presence of alkaline earth metal hydroxide, or reacting the indole-2-carboxylic acid ester with an organic acid in the presence of a mineral acid, or heating the indole-2-carboxylic acid ester together with a mineral acid or toluenesulfonic acid, or reacting the indole-2-carboxylic acid ester with hydrogen to yield an indole-2-carboxylic acid represented by the formula,

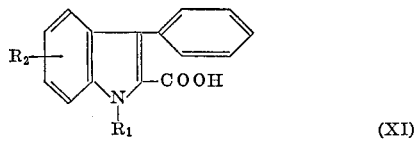

wherein $R_1$ and $R_2$ respectively have the same meanings as defined above, reacting the resultant indole-2-carboxylic acid of the Formula XI or the acid halide or mixed anhydride thereof in the presence of a solvent with ammonia or hydroxylamine and further, if necessary, reacting the resulting compounds with phosphorous pentasulfide to yield an indole-2-carboxylic acid represented by the formula,

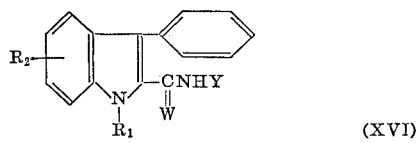

wherein $R_1$ and $R_2$ respectively have the same meanings as defined above, W is oxygen or sulfur atom and Y is hydrogen atom or hydroxyl, reducing the resultant indole-2-carboxylic acid of the Formula XVI to yield a 2-aminomethyl indole represented by the formula,

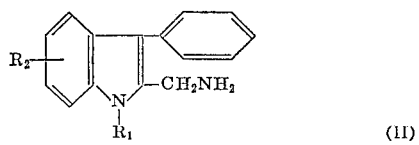

wherein $R_1$ and $R_2$ respectively have the same meanings as defined above, and then reacting the resultant 2-aminomethyl indole of the Formula II or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I.

24. A process according to claim 23 wherein said solvent is selected from the group consisting of alkanols, acetone, benzene, toluene, xylene, chlorobenzene and chloroform.

25. A process according to claim 23 wherein said resultant indole-2-carboxylic acid of the Formula XVI is reduced by electrolytic reduction, reduction using alkali metal in alkanols, catalytic reduction in the presence of a catalyst or reduction with metal hydride complex.

26. A process for preparing a benzodiazepine represented by the formula,

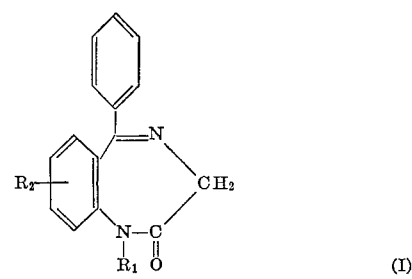

wherein $R_1$ is hydrogen, an alkyl having 1 to 3 carbon atoms, and $R_2$ is hydrogen or a halogen, which comprises reacting an indole-2-carboxylic acid ester represented by the formula,

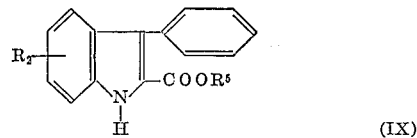

or an N-alkylindole-2-carboxylic acid ester represented by the formula,

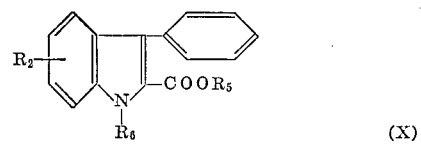

wherein $R_2$ has the same meanings as defined above, $R_5$ is an alkyl having 1 to 4 carbon atoms or benzyl and $R_6$ is an alkyl having 1 to 3 carbon atoms, with water, alkanols or water and alkanols in the presence of alkaline earth metal hydroxide, or reacting the indole-2-carboxylic acid ester with an organic acid in the presence of a mineral acid, or heating the indole-2-carboxylic acid ester together with a mineral acid or toluenesulfonic acid, or reacting the indole-2-carboxylic acid ester with hydrogen to yield an indole-2-carboxylic acid represented by the formula,

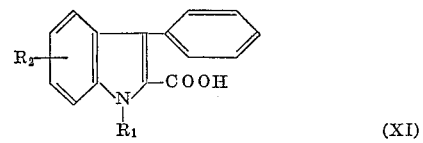

wherein $R_1$ and $R_2$ have the same meanings as defined above, reacting the resultant indole-2-carboxylic acid of the Formula XI with a halogenating agent selected from the group consisting of thionyl chloride, phosphorous trichloride, phosphorus tribromide, phosphorous pentachloride, phosphorous chloride and phosgene to yield indole-2-carboxylic halides represented by the formula,

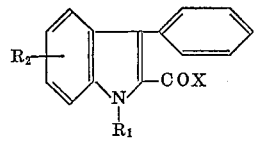

(XIII)

wherein $R_1$ and $R_2$ respectively have the same meanings as defined above and X is a halogen, reacting the resultant indole carboxylic halides with ammonia to yield an indole-2-carboxylic acid amide represented by the formula,

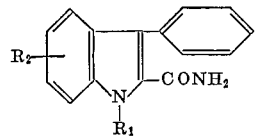

(XVIII)

wherein $R_1$ and $R_2$ respectively have the same meanings as defined above, reducing the resultant indole-2-carboxylic acid amides of the Formula XVIII to yield a 2-aminomethyl indole represented by the formula,

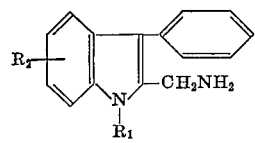

(II)

wherein $R_1$ and $R_2$ respectively have the same meanings as defined above, and then reacting the resultant 2-aminomethyl indole of the Formula II or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I.

27. A process according to claim 10 wherein said indole-2-carboxylic acid of the Formula XI is reacted in the presence of a solvent selected from the group consisting of benzene, toluene, ether, chloroform, methylene chloride and carbon tetrachloride.

28. A process according to claim 10 wherein said resultant indole-2-carboxylic acid amide of the Formula XVIII is reduced by electrolytic reduction, reduction using alkali metal in alkanols, catalytic reduction in the presence of a catalyst or reduction with metal hydride complex.

29. A process for producing a benzodiazepine represented by the formula,

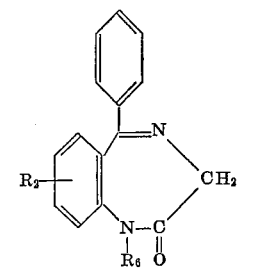

(I')

wherein $R_2$ is hydrogen or a halogen and $R_6$ is an alkyl having 1 to 3 carbon atoms, which comprises reacting an indole-2-carboxylic acid ester represented by the formula,

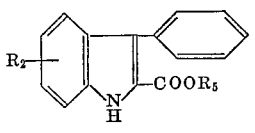

(IX)

wherein $R_2$ has the same meanings as defined above and $R_5$ is an alkyl having 1 to 4 carbon atoms or benzyl, with an alkaline condensing agent selected from the group consisting of alkali metal, alkaline earth metal, alkali metal hydride, alkaline earth metal hydroxide, alkali metal amide and alkaline earth metal amide, if necessary, or alkaline metal salts thereof with alkylating agents selected from the group consisting of alkyl halide, alkyl sulfonate and alkyl aromatic sulfonate to yield an N-alkylindole-2-carboxylic acid ester represented by the formula,

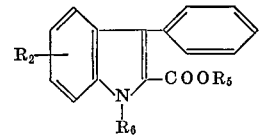

(X)

wherein $R_2$, $R_5$ and $R_6$ respectively have the same meanings defined above, reacting the resultant N-alkylindole-2-carboxylic acid ester of the Formula X with water, alkanols or water and alkanols in the presence of alkaline earth metal hydroxide, or reacting the indole-2-carboxylic acid ester with an organic acid in the presence of a mineral acid, or heating the indole-2-carboxylic acid ester together with a mineral acid or toluene-sulfonic acid, or reacting the indole-2-carboxylic acid ester with hydrogen to yield an indole-2-carboxylic acid represented by the formula,

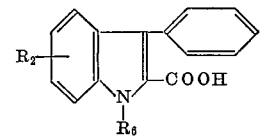

(XI')

wherein $R_2$ and $R_6$ respectively have the same meanings as defined above, reacting the resultant indole-2-carboxylic acid of the Formula XI' or the acid halide or mixed anhydride in the presence of a solvent with ammonia to yield an indole represented by the formula,

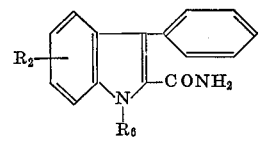

(XV)

wherein $R_2$ and $R_6$ respectively have the same meanings as defined above, reducing the resultant indole of the Formula XV to a 2-aminomethyl indole represented by the formula,

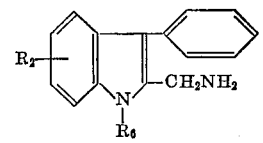

(XVII)

wherein $R_2$ and $R_6$ respectively have the same meanings as defined above, and then reacting the resultant 2-aminomethyl indole of the Formula XVII or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I'.

30. A process according to claim 29 wherein said solvent is selected from the group consisting of alkanols, acetone, benzene, toluene, xylene, chlorobenzene and chloroform.

31. A process according to claim 10 wherein said resultant indole of the Formula XV is reduced by electrolytic reduction, reduction using alkali metal in alkanols, catalytic reduction in the presence of a catalyst or reduction with metal hydride complex.

32. A process for preparing a benzodiazepine represented by the formula,

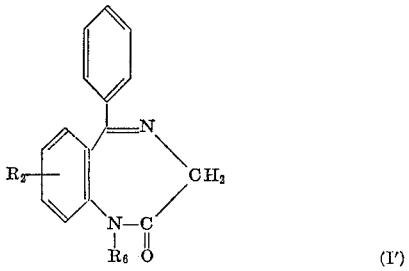

(I′)

wherein $R_2$ is hydrogen or a halogen and $R_6$ is an alkyl having 1 to 3 carbon atoms, which comprises reacting indole-2-carboxylic acid ester derivatives represented by the formula,

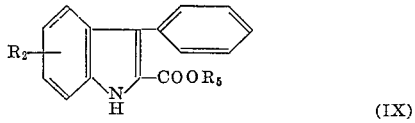

(IX)

wherein $R_2$ has the same meanings as defined above and $R_5$ is an alkyl having 1 to 4 carbon atoms or benzyl, with an alkylating agent selected from the group consisting of alkyl halide, alkyl sulfonate and alkyl aromatic sulfonate to yield an N-alkyl-indole-2-carboxylic acid ester represented by the formula,

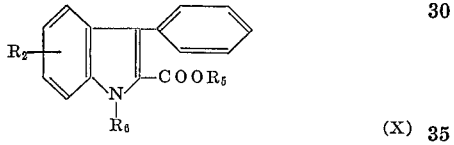

(X)

wherein $R_2$, $R_5$ and $R_6$ respectively have the same meanings as defined above, reacting the resultant N-alkylindole-2-carboxylic acid ester of the Formula X with water, alkanols or water and alkanols in the presence of alkaline earth metal hydroxide, or reacting the indole-2-carboxylic acid ester with an organic acid in the presence of a mineral acid, or heating the indole-2-carboxylic acid ester together with a mineral acid or toluenesulfonic acid, or reacting the indole-2-carboxylic acid ester with hydrogen to yield an indole-2-carboxylic acid represented by the formula,

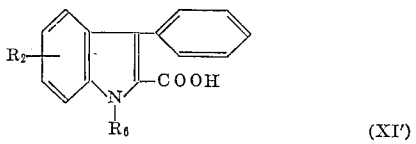

(XI′)

wherein $R_2$ and $R_6$ respectively have the same meanings as defined above, reacting the resultant indole-2-carboxylic acid of the Formula XI′ or the acid halide or mixed anhydride thereof in the presence of a solvent with ammonia to yield an indole represented by the formula,

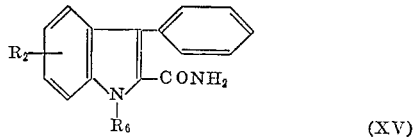

(XV)

wherein $R_2$ and $R_6$ respectively have the same meanings as defined above, dehydrating the resultant indole of the Formula XV in the presence of a compound selected from the group consisting of a phosphorus halide and an acid chloride to yield an indole-2-carbonitrile represented by the formula,

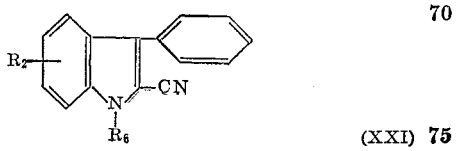

(XXI)

wherein $R_2$ and $R_6$ respectively have the same meanings as defined above, reducing the resultant indole-2-carbonitrile of the Formula XXI to yield a 2-aminomethyl indole represented by the formula,

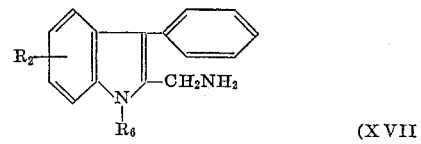

(XVII)

wherein $R_2$ and $R_6$ respectively have the same meanings as defined above, and then reacting the resultant 2-aminomethyl indole of the Formula XVII or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I′.

33. A process according to claim 32 wherein said resultant indole-2-carbonitrile is reduced by electrolytic reduction, reduction by alkali metal in alcohol, catalytic reduction, reduction by chromous acid-alkali or reduction by metal hydride complex.

34. A process according to claim 32 wherein said resultant indole of the Formula XV is dehydrated in the presence of an inert solvent.

35. A process for producing a benzodiazepine represented by the formula,

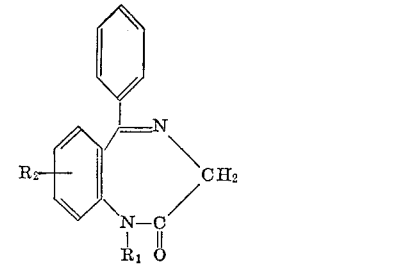

wherein $R_1$ is hydrogen, an alkyl having 1 to 3 carbon atoms, and $R_2$ is hydrogen or a halogen, which comprises reacting phenylpyruvic acid represented by the formula,

(II)

wherein $R_3$ is hydrogen, an alkyl having 1 to 4 carbon atoms or benzyl, with phenylhydrazine represented by the formula,

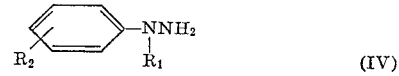

(IV)

wherein $R_1$ and $R_2$ respectively have the same meanings as defined above, to yield an indole-2-carboxylic acid represented by the formula,

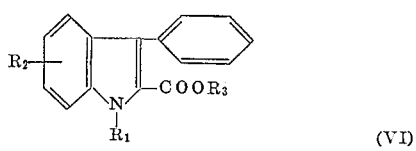

(VI)

wherein $R_1$, $R_2$ and $R_3$ respectively have the same meanings as defined above, reacting the resultant indole-2-carboxylic acid of the Formula VI or their reactive derivatives with ammonia or hydroxylamine and further, if desired, reacting a reaction product with phosphorous pentasulfide to yield an indole-2-carboxylic acid represented by the formula,

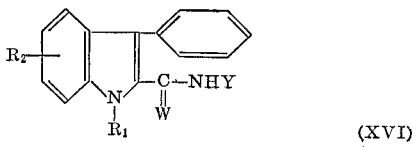

(XVI)

wherein $R_1$ and $R_2$ respectively have the same meanings as defined above, W is oxygen or sulfur and Y is hydrogen or hydroxyl, reducing the resultant indole-2-carboxylic acid of the Formula XVI to yield a 2-aminomethyl indole represented by the formula,

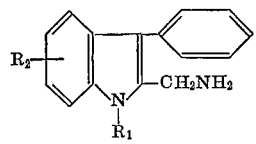

(II)

wherein $R_1$ and $R_2$ respectively have the same meanings as defined above, and then reacting the resultant 2-aminomethyl indole of the Formula II or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I.

36. A process according to claim 35 wherein said resultant indole-2-carboxylic acid of the Formula XVI is reduced by electrolytic reduction, reduction using alkali metal in alkanols, catalytic reduction in the presence of a catalyst or reduction with metal hydride complex.

37. A process according to claim 35 wherein said phenylpyruvic acid of the Formula III is reacted with said phenylhydrazine of the Formula IV in a solvent selected from the group consisting of methanol, ethanol, isopropanol, tertiary butanol, benzene, toluene, xylene, formic acid, acetic acid, acetone and cyclohexane, and in the presence of an acid catalyst selected from the group consisting of mineral acids, organic acids, Lewis acids and cation exchange resins.

38. A process for preparing a benzodiazepine represented by the formula,

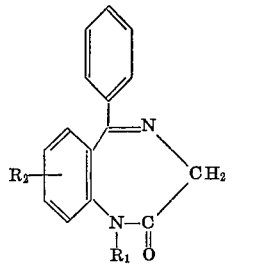

(I)

wherein $R_1$ is hydrogen, an alkyl having 1 to 3 carbon atoms, and $R_2$ is hydrogen or halogen atom, which comprises reacting phenylpyruvic acid represented by the formula,

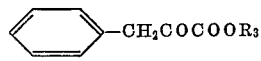

(III)

wherein $R_3$ is hydrogen, an alkyl having 1 to 4 carbon atoms or benzyl, with phenylhydrazine represented by the formula,

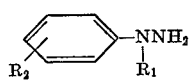

(IV)

wherein $R_1$ and $R_2$ respectively have the same meanings as defined above, to yield a phenylhydrazone represented by the formula,

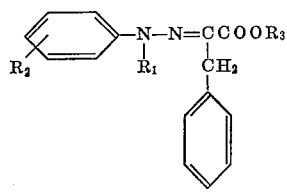

(V)

wherein $R_1$, $R_2$ and $R_3$ respectively have the same meanings as defined above, treating the resultant phenylhydrazone of the Formula V in the presence of an acid to yield an indole-2-carboxylic acid represented by the formula,

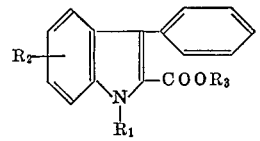

(VI)

wherein $R_1$, $R_2$ and $R_3$ respectively have the same meanings as defined above, reacting the resultant indole-2-carboxylic acid of the Formula VI or their reactive derivatives with ammonia or hydroxylamine and further, if necessary, reacting a reaction product with phosphorous pentasulfide to yield an indole-2-carboxylic acid represented by the formula,

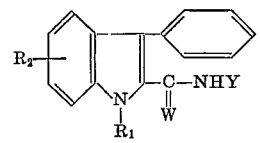

(XVI)

wherein $R_1$ and $R_2$ respectively have the same meanings as defined above, W is oxygen or sulfur and Y is hydrogen or hydroxyl, reducing the resultant indole-2-carboxylic acid of the Formula XVI to yield a 2-aminomethyl indole represented by the formula,

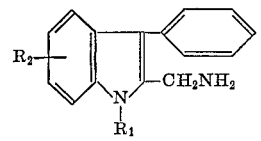

(II)

wherein $R_1$ and $R_2$ respectively have the same meanings as defined above, and then reacting the resultant 2-aminomethyl indole of the Formula II or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I.

39. A process according to claim 38 wherein said resultant indole-2-carboxylic acid of the Formula XVI is reduced by electrolytic reduction, reduction using alkali metal in alkanols, catalytic reduction in the presence of a catalyst or reduction with metal hydride complex.

40. A process according to claim 38 wherein said acid is selected from the group consisting of mineral acids, organic acids and Lewis acids in a solvent.

41. A process for producing a benzodiazepine represented by the formula,

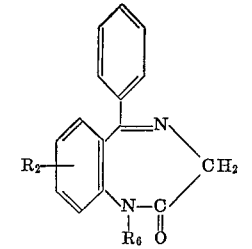

(I′)

wherein $R_2$ is hydrogen or a halogen and $R_6$ is an alkyl having 1 to 3 carbon atoms, which comprises reacting a β-keto acid ester represented by the formula,

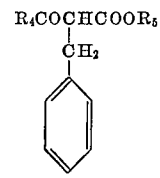

(VII)

wherein R₄ is an alkyl having 1 to 4 carbon atoms and R₅ is an alkyl having 1 to 4 carbon atoms or benzyl, with benzene diazonium salts represented by the formula,

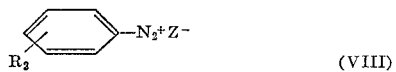

wherein R₂ has the same meanings as defined above and Z is a halogen, to yield a phenylhydrazone represented by the formula,

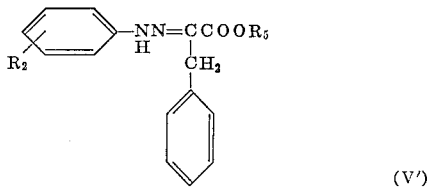

wherein R₂ and R₅ respectively have the same meanings as defined above, treating the resultant phenylhydrazone of the formula V′ in the presence of an acid to yield an indole-2-carboxylic acid ester represented by the formula,

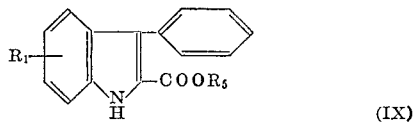

wherein R₂ and R₅ respectively have the same meanings as defined above, reacting the resultant indole-2-carboxylic acid ester of the Formula IX with an alkylating agent selected from the group consisting of alkyl halide, alkyl sulfonate and alkyl aromatic sulfonate to yield an N-alkylindole-2-carboxylic acid ester represented by the formula,

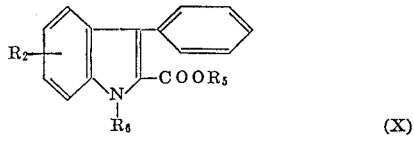

wherein R₂, R₅ and R₆ respectively have the same meanings as defined above, reacting the resultant N-alkylindole-2-carboxylic acid ester of the Formula X with water, alkanols or water and alkanols in the presence of alkaline earth metal hydroxide, or reacting the indole-2-carboxylic acid ester with an organic acid in the presence of a mineral acid, or heating the indole-2-carboxylic acid ester together with in mineral acid or toluenesulfonic acid, or reacting the indole-2-carboxylic acid ester with hydrogen to yield an indole-2-carboxylic acid represented by the formula,

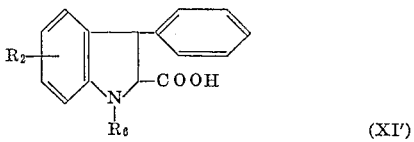

wherein R₂ and R₆ respectively have the same meanings as defined above, reacting the resultant indole-2-carboxylic acid of the Formula XI′ or the acid halide or mixed anhydride thereof in the presence of a solvent with ammonia or hydroxylamine and further, if necessary, reacting the resulting compounds with phosphorous pentasulfide to yield an indole-2-carboxylic acid represented by the formula,

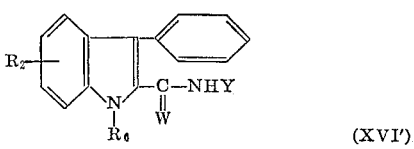

wherein R₂ and R₆ respectively have the same meanings as defined above, W is oxygen or sulfur and Y is hydrogen or hydroxyl, reducing the resultant indole-2-carboxylic acid to a 2-aminomethyl indole represented by the formula,

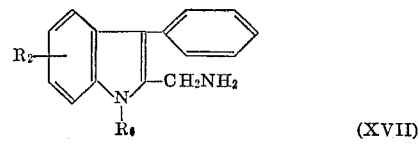

wherein R₂ and R₆ respectively have the same meanings as defined above, and then reacting the resultant 2-aminomethyl indole of the Formula XVII or the acid addition salt thereof with at least the stoichiometric amount of an oxidizing agent selected from the group consisting of ozone, hydrogen peroxide, peracids, chromic acid and potassium permanganate in the presence of an inert solvent to yield benzodiazepine of the Formula I′.

42. A process according to claim 15 wherein said solvent is selected from the group consisting of alkanols, acetone, benzene, toluene, xylene, chlorobenzene and chloroform.

43. A process according to claim 42 wherein said resultant indole-2-carboxylic acid of the Formula XVI′ is reduced by electrolytic reduction, reduction using alkali metal in alkanols, catalytic reduction in the presence of a catalyst or reduction with metal hydride complex.

44. A process according to claim 42 wherein said β-keto acid ester of the Formula VII is reacted in the presence of a base selected from the group consisting of sodium hydroxide, potassium hydroxide, sodium methylate and sodium ethylate in a solvent selected from the group consisting of water, methanol and ethanol at a temperature below 10° C.

45. A process according to claim 42 wherein said acid is selected from the group consisting of mineral acids, organic acids and Lewis acids in a solvent.

46. A process for preparing a benzodiazepine represented by the formula,

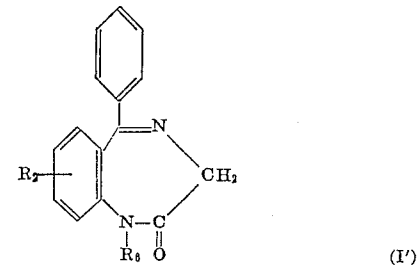

wherein R₂ is hydrogen or a halogen and R₆ is an alkyl having 1 to 3 carbon atoms, which comprises reacting a β-keto acid ester repreesnted by the formula,

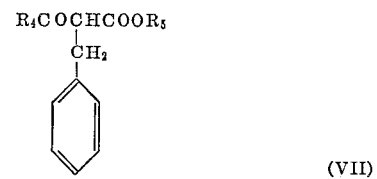

wherein R₄ is an alkyl having 1 to 4 carbon atoms and R₅ is an alkyl having 1 to 4 carbon atoms or benzyl, with benzene diazonium salts represented by the formula,

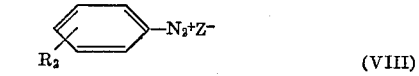

wherein $R_2$ has the same meanings as defined above, and Z is a halogen atom, to yield an azo represented by the formula,

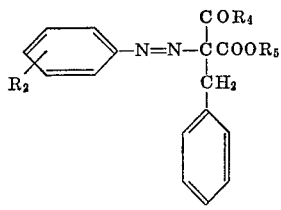

(XXII)

wherein $R_2$, $R_4$ and $R_5$ respectively have the same meanings as defined above, treating the resulting azo of the Formula XXII in the presence of an acid to yield an indole-2-carboxylic acid ester represented by the formula,

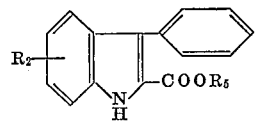

(IX)

wherein $R_2$ and $R_5$ respectively have the same meanings as defined above, reacting the resultant indole-2-carboxylic acid ester of the Formula IX with an alkylating agent selected from the group consisting of alkyl halide, alkyl sulfonate and alkyl aromatic sulfonate to yield an N-alkylindole-2-carboxylic acid ester represented by the formula,

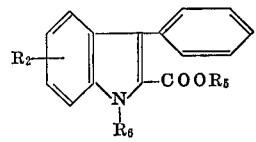

(X)

wherein $R_2$, $R_5$ and $R_6$, respectively have the same meanings as defined above, reacting the resultant N-alkyl-indole-2-carboxylic acid ester of the Formula X with water, alkanols or water and alkanols in the presence of alkaline earth metal hydroxide, or reacting the indole-2-carboxylic acid ester with an organic acid in the presence of a mineral acid, or heating the indole-2-carboxylic acid ester together with a mineral acid or toluene-sulfonic acid, or reacting the indole-2-carboxylic acid ester with hydrogen to yield an indole-2-carboxylic acid represented by the formula,

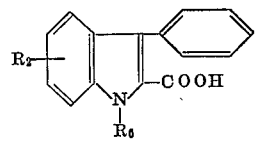

(XI')

wherein $R_2$ and $R_6$ respectively have the same meanings as defined above, reacting the resultant indole-2-carboxylic acid of the Formula XI' or the acid halide or mixed anhydride thereof in the presence of a solvent with ammonia or hydroxylamine and further, if necessary, reacting the resultant compounds with phosphorous pentasulfide to yield an indole-2-carboxylic acid represented by the formula,

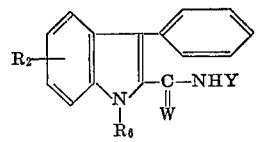

(XVI')

wherein $R_2$ and $R_6$ respectively have the same meanings as defined above, W is oxygen or sulfur atom and Y is hydrogen atom or hydroxyl group, reducing the resultant indole-2-carboxylic acid derivatives of the Formula XVI' to yield a 2-aminomethyl-indole represented by the formula,

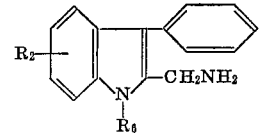

(XVII)

wherein $R_2$ and $R_6$ respectively have the same meanings as defined above, and then reacting the resultant 2-aminomethyl indole of the Formula XVII or the acid addition salt thereof with at least the stoichiometric amount of an oxidizing agent selected from the group consisting of ozone, hydrogen peroxide, peracids, chromic acid and potassium permanganate in the presence of an inert solvent to yield the benzodiazepine of the Formula I'.

47. A process according to claim 46 wherein said solvent is selected from the group consisting of alkanols, acetone, benzene, toluene, xylene, chlorobenzene and chloroform.

48. A process according to claim 46 wherein said resultant indole-2-carboxylic acid of the Formula XVI' is reduced by electrolytic reduction, reduction using alkali metal in alkanols, catalytic reduction in the presence of a catalyst or reduction with metal hydride complex.

49. A process according to claim 46 wherein said β-keto acid ester of the Formula VII is reacted in the presence of a weak base selected from the group consisting of sodium acetate and potassium acetate in a solvent selected from the group consisting of water, methanol and ethanol at a temperature below 10° C.

50. A process according to claim 46 wherein said acid is selected from the group consisting of mineral acids, organic acids and Lewis acids in a solvent.

51. A process for preparing the acid addition salt of benzodiazepine represented by the formula,

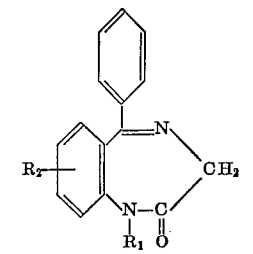

(I)

wherein $R_1$ is hydrogen or alkyl having 1 to 3 carbon atoms, and $R_2$ is hydrogen or a halogen, which comprises reacting a 2-aminomethyl indole represented by the formula,

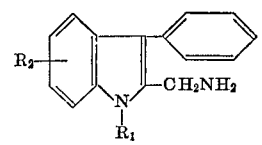

(II)

wherein $R_1$ and $R_2$ respectively have the same meanings as defined above or the acid addition salt thereof, with at least the stoichiometric amount of an oxidizing agent selected from the group consisting of ozone, hydrogen peroxide, peracids, chromic acid and potassium permanganate in the presence of an inert solvent, and to yield the benzodiazepine of the Formula I and reacting the benzodiazepine of the Formula I with a mineral or organic acid to yield the acid addition salt thereof.

References Cited

Elderfield "Heterocyclic Compounds," vol. 3, pp. 8–13 (Wiley) (1952).

Noller "Chemistry of Organic Compounds," 2nd ed., pp. 250, 254 (Saunders) (1957).

Chemical Abstracts, vol. 52 (1958), cols. 11,039–11,040 abstracting Nograd: "Monatsh. Chem.," vol. 88, pp. 1087–94 (1958).

HENRY R. JILES, Primary Examiner

R. T. BOND, Assistant Examiner

U.S. Cl. X.R.

260—999, 326.12, 326.13, 515 R, 326, 15, 569, 471 A, 471 R, 141, 518 R, 319.1; 424—244

UNITED STATES PATENT OFFICE
CERTIFICATE OF CORRECTION

Patent No. 3,632,574    Dated January 4, 1972

Inventor(s) Hisao Yamamoto et al.

It is certified that error appears in the above-identified patent and that said Letters Patent are hereby corrected as shown below:

Please delete reference to priority as follows:

" 42/60932 " of September 22, 1967

Signed and sealed this 27th day of June 1972.

(SEAL)
Attest:

EDWARD M. FLETCHER, JR.
Attesting Officer

ROBERT GOTTSCHALK
Commissioner of Patents